US008533823B2

(12) United States Patent
Szeto et al.

(10) Patent No.: US 8,533,823 B2
(45) Date of Patent: *Sep. 10, 2013

(54) SYSTEM AND METHOD FOR SOURCE IP ANTI-SPOOFING SECURITY

(75) Inventors: Ronald W. Szeto, Pleasanton, CA (US); Nitin Jain, Saratoga, CA (US); Ravindran Suresh, Santa Clara, CA (US); Philip Kwan, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 698 days.

This patent is subject to a terminal disclaimer.

(21) Appl. No.: 12/392,422

(22) Filed: Feb. 25, 2009

(65) Prior Publication Data

US 2009/0260083 A1    Oct. 15, 2009

Related U.S. Application Data

(63) Continuation of application No. 10/850,505, filed on May 20, 2004, now Pat. No. 7,516,487, which is a continuation-in-part of application No. 10/631,366, filed on Jul. 31, 2003, now Pat. No. 7,523,485.

(60) Provisional application No. 60/472,158, filed on May 21, 2003, provisional application No. 60/472,170, filed on May 21, 2003.

(51) Int. Cl.
*G06F 12/00* (2006.01)

(52) U.S. Cl.
USPC .............................................. 726/22; 726/23

(58) Field of Classification Search
USPC ...................................................... 726/22, 23
See application file for complete search history.

(56) References Cited

U.S. PATENT DOCUMENTS

| 4,897,874 A | 1/1990 | Lidinsky et al. |
| 5,237,614 A | 8/1993 | Weiss |
| 5,721,780 A | 2/1998 | Ensor et al. |
| 5,757,924 A | 5/1998 | Friedman et al. |
| 5,774,551 A | 6/1998 | Wu et al. |
| 5,812,819 A | 9/1998 | Rodwin et al. |
| 5,825,890 A | 10/1998 | Elgamal et al. |

(Continued)

OTHER PUBLICATIONS

Cisco ("Configuring Port-Based Traffic Control," Catalyst 3550 Multilayer Switch Software Configuration Guide, Cisco IOS Release 12.1 (13) EA1, Mar. 2003, pp. 1-48, Ch. 20 Cisco Systems, Inc.*

(Continued)

*Primary Examiner* — Peter Poltorak
(74) *Attorney, Agent, or Firm* — Fountainhead Law Group P.C.

(57) ABSTRACT

A system and method that provides for using source IP addresses and MAC addresses in a network to provide security against attempts by users of the network to use false source IP addresses in data packets. The system and method provide for analyzing MAC addresses and source IP addresses at the datalink (layer 2) level, and to use the information derived from such analysis to block access through a port where a host device is using a false, or spoofed, source IP address in transmitted data packets. Further, the system and method provide for validating initially learned source IP addresses, and for determining whether the number of unsuccessful attempts to validate new source IP addresses exceeds a threshold level, and where the number does exceed the threshold number the system and method can provide for operation in a possible attack mode.

19 Claims, 9 Drawing Sheets

(56) References Cited

U.S. PATENT DOCUMENTS

| | | | |
|---|---|---|---|
| 5,835,720 A | 11/1998 | Nelson et al. | |
| 5,892,903 A | 4/1999 | Klaus | |
| 5,894,479 A | 4/1999 | Mohammed | |
| 5,946,308 A | 8/1999 | Dobbins et al. | |
| 5,951,651 A | 9/1999 | Lakshman et al. | |
| 5,958,053 A | 9/1999 | Denker | |
| 5,974,463 A | 10/1999 | Warrier et al. | |
| 6,009,103 A | 12/1999 | Woundy | |
| 6,021,495 A | 2/2000 | Jain et al. | |
| 6,115,376 A | 9/2000 | Sherer et al. | |
| 6,167,052 A | 12/2000 | McNeill et al. | |
| 6,167,445 A | 12/2000 | Gai et al. | |
| 6,212,191 B1 | 4/2001 | Alexander et al. | |
| 6,219,790 B1 | 4/2001 | Lloyd et al. | |
| 6,256,314 B1 | 7/2001 | Rodrig et al. | |
| 6,338,089 B1 | 1/2002 | Quinlan | |
| 6,339,830 B1 | 1/2002 | See et al. | |
| 6,363,489 B1 | 3/2002 | Comay et al. | |
| 6,393,484 B1 | 5/2002 | Massarani | |
| 6,496,502 B1 | 12/2002 | Fite, Jr. et al. | |
| 6,510,236 B1 | 1/2003 | Crane et al. | |
| 6,519,646 B1 | 2/2003 | Gupta et al. | |
| 6,553,028 B1 | 4/2003 | Tang et al. | |
| 6,615,264 B1 | 9/2003 | Stoltz et al. | |
| 6,651,168 B1 | 11/2003 | Kao et al. | |
| 6,665,278 B2 | 12/2003 | Grayson | |
| 6,728,246 B1 | 4/2004 | Egbert et al. | |
| 6,732,270 B1 | 5/2004 | Patzer et al. | |
| 6,751,728 B1 | 6/2004 | Gunter et al. | |
| 6,771,649 B1 | 8/2004 | Tripunitara et al. | |
| 6,775,290 B1 | 8/2004 | Merchant et al. | |
| 6,789,118 B1 | 9/2004 | Rao | |
| 6,807,179 B1 | 10/2004 | Kanuri et al. | |
| 6,813,347 B2 | 11/2004 | Baals et al. | |
| 6,853,988 B1 | 2/2005 | Dickinson et al. | |
| 6,874,090 B2 | 3/2005 | See et al. | |
| 6,892,309 B2 | 5/2005 | Richmond et al. | |
| 6,907,470 B2 | 6/2005 | Sawada et al. | |
| 6,912,592 B2 | 6/2005 | Yip | |
| 6,950,628 B1 | 9/2005 | Meier et al. | |
| 6,959,336 B2 | 10/2005 | Moreh et al. | |
| 6,980,515 B1 | 12/2005 | Schunk et al. | |
| 6,981,054 B1 | 12/2005 | Krishna | |
| 7,028,098 B2 | 4/2006 | Mate et al. | |
| 7,032,241 B1 | 4/2006 | Venkatachary et al. | |
| 7,062,566 B2 | 6/2006 | Amara et al. | |
| 7,079,537 B1 | 7/2006 | Kanuri et al. | |
| 7,088,689 B2 | 8/2006 | Lee et al. | |
| 7,092,943 B2 | 8/2006 | Roese et al. | |
| 7,093,280 B2 | 8/2006 | Ke et al. | |
| 7,113,479 B2 | 9/2006 | Wong | |
| 7,114,008 B2 | 9/2006 | Jungck et al. | |
| 7,131,141 B1 | 10/2006 | Blewett et al. | |
| 7,134,012 B2 * | 11/2006 | Doyle et al. | 713/151 |
| 7,155,518 B2 | 12/2006 | Forslow | |
| 7,188,364 B2 | 3/2007 | Volpano | |
| 7,194,554 B1 | 3/2007 | Short et al. | |
| 7,234,163 B1 | 6/2007 | Rayes et al. | |
| 7,249,374 B1 | 7/2007 | Lear et al. | |
| 7,302,700 B2 | 11/2007 | Mao et al. | |
| 7,343,441 B1 | 3/2008 | Chrysanthakopoulos et al. | |
| 7,360,086 B1 | 4/2008 | Tsuchiya et al. | |
| 7,360,245 B1 | 4/2008 | Ramachandran et al. | |
| 7,469,298 B2 | 12/2008 | Kitada et al. | |
| 7,483,971 B2 | 1/2009 | Sylvest et al. | |
| 7,490,351 B1 | 2/2009 | Caves et al. | |
| 7,493,084 B2 | 2/2009 | Meier et al. | |
| 7,500,069 B2 | 3/2009 | Hochmuth et al. | |
| 7,516,487 B1 | 4/2009 | Szeto et al. | |
| 7,523,485 B1 | 4/2009 | Kwan | |
| 7,529,933 B2 | 5/2009 | Palekar et al. | |
| 7,536,464 B1 | 5/2009 | Dommety et al. | |
| 7,562,390 B1 | 7/2009 | Kwan | |
| 7,567,510 B2 | 7/2009 | Gai et al. | |
| 7,596,693 B1 | 9/2009 | Caves et al. | |
| 7,735,114 B2 | 6/2010 | Kwan et al. | |
| 7,774,833 B1 | 8/2010 | Szeto et al. | |
| 7,876,772 B2 | 1/2011 | Kwan | |
| 7,979,903 B2 | 7/2011 | Kwan | |
| 8,006,304 B2 | 8/2011 | Kwan | |
| 2001/0012296 A1 | 8/2001 | Burgess et al. | |
| 2002/0016858 A1 | 2/2002 | Sawada | |
| 2002/0055980 A1 | 5/2002 | Goddard | |
| 2002/0065938 A1 * | 5/2002 | Jungck et al. | 709/246 |
| 2002/0146002 A1 | 10/2002 | Sato | |
| 2002/0146107 A1 | 10/2002 | Baals et al. | |
| 2002/0165956 A1 | 11/2002 | Phaal | |
| 2003/0028808 A1 | 2/2003 | Kameda | |
| 2003/0043763 A1 | 3/2003 | Grayson | |
| 2003/0051041 A1 | 3/2003 | Kalavade et al. | |
| 2003/0056001 A1 | 3/2003 | Mate et al. | |
| 2003/0067874 A1 | 4/2003 | See et al. | |
| 2003/0105881 A1 | 6/2003 | Symons et al. | |
| 2003/0142680 A1 | 7/2003 | Oguchi | |
| 2003/0167411 A1 | 9/2003 | Maekawa | |
| 2003/0177350 A1 | 9/2003 | Lee | |
| 2003/0188003 A1 | 10/2003 | Sylvest et al. | |
| 2003/0226017 A1 | 12/2003 | Palekar et al. | |
| 2003/0236898 A1 | 12/2003 | Hu et al. | |
| 2004/0003285 A1 | 1/2004 | Whelan et al. | |
| 2004/0053601 A1 | 3/2004 | Frank et al. | |
| 2004/0078485 A1 | 4/2004 | Narayanan | |
| 2004/0160903 A1 | 8/2004 | Gai et al. | |
| 2004/0177276 A1 | 9/2004 | MacKinnon et al. | |
| 2004/0210663 A1 | 10/2004 | Phillips et al. | |
| 2004/0213172 A1 | 10/2004 | Myers et al. | |
| 2004/0213260 A1 | 10/2004 | Leung et al. | |
| 2004/0255154 A1 | 12/2004 | Kwan et al. | |
| 2005/0021979 A1 | 1/2005 | Wiedmann et al. | |
| 2005/0025125 A1 | 2/2005 | Kwan | |
| 2005/0055570 A1 | 3/2005 | Kwan et al. | |
| 2005/0091313 A1 | 4/2005 | Zhou et al. | |
| 2005/0254474 A1 | 11/2005 | Iyer et al. | |
| 2006/0028996 A1 | 2/2006 | Huegen et al. | |
| 2006/0155853 A1 | 7/2006 | Nesz et al. | |
| 2007/0220596 A1 | 9/2007 | Keeler et al. | |
| 2009/0254973 A1 | 10/2009 | Kwan et al. | |
| 2009/0265785 A1 | 10/2009 | Kwan | |
| 2009/0307773 A1 | 12/2009 | Kwan | |
| 2010/0333191 A1 | 12/2010 | Szeto et al. | |
| 2012/0011584 A1 | 1/2012 | Kwan | |

OTHER PUBLICATIONS

Welcher, "Switching MultiLayer Switching," Chesapeake Netcraftsmen, Copyright 1999, pp. 1-7, available at URL: http//www.netcraftsmen.net/welcher/papers/switchhmls.html.

Wright, "Using Policies for Effective Network Management," International Journal of Network Management, Copyright 1999, pp. 118-125, John Wiley & Sons, Ltd.

Non-Final Office Action for U.S. Appl. No. 10/458,628, mailed on Oct. 8, 2009, 23 pages.

Final Office Action for U.S. Appl. No. 10/458,628, mailed on Mar. 24, 2010, 29 pages.

Final Office Action for U.S. Appl. No. 10/631,898, mailed on Dec. 18, 2009, 17 pages.

Non-Final Office Action for U.S. Appl. No. 10/631,898, mailed on Feb. 18, 2010, 24 pages.

Non-Final Office Action for U.S. Appl. No. 10/654,417, mailed on Sep. 4, 2009, 20 pages.

Final Office Action for U.S. Appl. No. 10/654,417, mailed on Mar. 24, 2010, 28 pages.

Notice of Allowance for U.S. Appl. No. 10/654,417, mailed on Apr. 22, 2010, 14 pages.

Notice of Allowance for U.S. Appl. No. 10/668,455, mailed on Jun. 1, 2010, 8 pages.

Office Action for U.S. Appl. No. 10/925,155, mailed Mar. 20, 2008.

Office Action for U.S. Appl. No. 10/925,155, mailed on Oct. 27, 2008.

Office Action for U.S. Appl. No. 10/925,155, mailed on Apr. 14, 2009.

Office Action for U.S. Appl. No. 10/925,155, mailed on Jan. 11, 2010.

Non-Final Office Action for U.S. Appl. No. 12/392,398, mailed on Sep. 1, 2010, 22 pages.
Gill, "Catalyst Secure Template," Nov. 14, 2002, version 1.21, printed on Nov. 29, 2010, at URL: http://www.cymru.com/gillsr/documents/catalyst-secure-template.htm, pp. 1-19.
Cisco Systems, "Virtual LAN Security Best Practices," copyright 1992-2002, pp. 1-13, Cisco Systems, Inc.
Non-Final Office Action for U.S. Appl. No. 10/458,628, mailed Dec. 8, 2006, 14 pages.
Final Office Action for U.S. Appl. No. 10/458,628, mailed Jun. 1, 2007, 19 pages.
Non-Final Office Action for U.S. Appl. No. 10/458,628, mailed Nov. 30, 2007, 19 pages.
Non-Final Office Action for U.S. Appl. No. 10/458,628, mailed Aug. 15, 2008, 20 pages.
Non-Final Office Action for U.S. Appl. No. 10/631,366. mailed Feb. 2, 2007, 14 pages.
Non-Final Office Action for U.S. Appl. No. 10/631,898, mailed Jul. 24, 2007, 11 pages.
Non-Final Office Action for U.S. Appl. No. 10/631,898, mailed Feb. 20, 2008, 13 pages.
Non-Final Office Action for U.S. Appl. No. 10/631,898, mailed Sep. 4, 2008, 14 pages.
Non-Final Office Action for U.S. Appl. No. 10/631,898, mailed Apr. 28, 2009, 17 pages.
Non-Final Office Action for U.S. Appl. No. 10/654,417, mailed Dec. 15, 2006, 11 pages.
Final Office Action for U.S. Appl. No. 10/654,417, mailed Jun. 18, 2007, 15 pages.
Non-Final Office Action for U.S. Appl. No. 10/654,417, mailed Dec. 31, 2007, 19 pages.
Non-Final Office Action for U.S. Appl. No. 10/654,417, mailed Jul. 29, 2008, 19 pages.
Final Office Action for U.S. Appl. No. 10/654,417, mailed Feb. 27, 2009, 17 pages.
Final Office Action for U.S. Appl. No. 12/392,398, mailed on Jan. 20, 2011, 11 pages.
Non-Final Office for U.S. Appl. No. 12/478,216, mailed on Sep. 13, 2010, 15 pages.
Requirement for Restriction/Election for U.S. Appl. No. 12/478,216, mailed on Jan. 18, 2011, 5 pages.
Non-Final Office Action for U.S. Appl. No. 12/478,229, mailed on Jan. 21, 2011, 15 pages.
U.S. Appl. No. 12/392,398, filed Feb. 25, 2009, Szeto et al.
U.S. Appl. No. 10/631,091, filed Jul. 31, 2003, Philip Kwan.
U.S. Appl. No. 10/668,455, filed Sep. 23, 2003, Szeto et al.
U.S. Appl. No. 10/925,155, filed Aug. 24, 2004, Philip Kwan.
"Authenticated VLANs: Secure Network Access at Layer 2," An Alcatel White Paper, Nov. 2002, pp. 1-14, Alcatel Internetworking, Inc.
"Automatic Spoof Detector (aka Spoofwatch)," Jan. 28, 2002, at URL: http://www.anml.iu.edu/PDF/Automatic_Spoof_Detector.pdf, printed on Jul. 23, 2003, 2 pages.
"CERT® Incident Note IN-2000-04 (Denial of Service Attacks using Nameservers)," Jan. 2001, at URL: http://www.cert.org/incident_notes/IN-2000-04.html, printed on Jul. 23, 2003, 3 pages.
"Configuring Port-Based Traffic Control," Catalyst 3550 Multilayer Switch Software Configuration Guide, Cisco IOS Release 12.1 (13) EA1, Mar. 2003, pp. 1-14, Ch. 20, Cisco Systems, Inc.
"Configuring Network Security with ACLs," Catalyst 3550 Multilayer Switch Software Configuration Guide, Cisco IOS Release 12.1 (13) EA1, Mar. 2003, pp. 1-48, Ch. 27, Cisco Systems, Inc.
"Configuring 802.1X Port-Based Authentication," Catalyst 3550 Multilayer Switch Software Configuration Guide, Cisco IOS Release 12.1 (13) EA1, Mar. 2003, pp. 1-18, Ch. 9, Cisco Systems, Inc.
"Cisco—Cable Source_Verify and IP Address Security," at URL: http://www.cisco.com/en/US/tech/tk86/tk803/technologies_tech_note09186a00800a7828.shtml (PDF & web pages), printed on Jul. 23, 2003, 25 pages.
"CISCO Catalyst 1900 Series Switches," at URL: http://www.cisco.com/en/US/products/hw/switches/ps574/products_configuration_guide_chapter09186a008007ef90.html#xtocid3, printed on Jul. 29, 2003, 13 pages (PDF & web pages).

"CISCO IOS Software Releases 12.2 T," at URL: http://www.cisco.com/en/US/products/sw/iosswrel/ps1839/products_feature_guide09186a00801543c8.html#1027177, printed on Jul. 29, 2003, 26 pages (PDF & web pages).
Congdon, P. et al., "IEEE 802.1X Remote Authentication Dial in User Service (RADIUS) Usage Guidelines," The Internet Society, 2003, at URL: http://www.faqs.org/ftp/rfc/pdf/rfc3580.txt.pdf, 30 pages.
Glenn, M., "A Summary of DoS/DDoS Prevention, Monitoring and Mitigation Techniques in a Service Provider Enviroment." SANS Institute, Aug. 21, 2003, 34 pages.
Haviland, G. "Designing High Preformance Campus Intranets with Multilayer Switching." 1998, 33 pages, Cisco Systems, Inc.
"IP Addressing Services," at URL: http://www.cisco.com/en/US/tech/tk648/tk361/technologies_tech_note09186a0080094adb.shtml, printed on Jul. 29, 2003, 10 pages (PDF & web pages).
"[IP-spoofing Demystified] (Trust-Relationship Exploitation)," Jun. 1996, at URL: http://www.networkcommand.com/docs/ipspoof.txt, printed on May 18, 2003, 9 pages.
Sharma, K., "IP Spoofing," 2001, at URL: http://www.linuxgazette.com/issue63/sharma.html, printed on Jul. 23, 2003, 3 pages.
"Keen Veracity Legions of the Underground," at URL: http://www.legions.org/kv/kv7.txt, printed on Jun. 24, 2003, pp. 1-41, Issue 7.
"IEEE Standard for Local and Metropolitan Area Networks—Port-Based Network Access Control" IEEE Std 802.1X-2001, Jul. 13, 2001, pp. 1-134, IEEE, The Institute of Electrical and Electronics Engineers, Inc.
Microsoft, "Recommendations for IEEE 802.11 Access Points," at URL: http://www.microsoft.com/whdc/device/network/802x/AccessPts.mspx, printed on Mar. 8, 2007, Apr. 2, 2002, pp. 1-16.
Pfleeger, "Security in Computing," $2^{nd}$ edition, 1996, p. 426-434, Prentice Hall PTR, NJ.
Schmid, S. et al., "An Access Control Architecture for Microcellular Wireless IPv6 Networks," pp. 454-463, LCN 2001: proceedings : 26th Annual IEEE Conference on Local Computer Networks : Nov. 14-16, 2001 : Tampa, Florida, USA, 2001, IEEE Computer Society, Los Alamitos, US.
Bass, S., "Spoofed IP Address Distributed Denial of Service Attacks: Defense-in-Depth," at URL: http://www.sans.org/rr/threats/spoofed.php, printed on Jul. 23, 2003, Aug. 13, 2001, 7 pages, version 2.0.
"Tech Brief Extreme Ware 6.2," at URL: http://www.extremenetworks.com/libraries/prodpdfs/products/ex_ware_tech_brief.pdf, printed on Jul. 29, 2003, 8 pages (Extreme Networks PDF).
"Unified Access Architecture for Wired and Wireless Networks," at URL: http://www.extremenetworks.com/libraries/prodpdfs/products/UnifiedWireless.asp, printed on Jul. 29, 2003, 10 pages.
Final Office Action for U.S. Appl. No. 10/458,628, mailed Feb. 26, 2009, 26 pages.
Non Final Office Action for U.S. Appl. No. 10/631,091, mailed Jan. 12, 2007, 9 pages.
Final Office Action for U.S. Appl. No. 10/631,091, mailed May 28, 2008, 13 pages.
Non Final Office Action for U.S. Appl. No. 10/631,091, mailed Oct. 28, 2008, 15 pages.
Notice of Allowance for U.S. Appl. No. 10/631,091, mailed Apr. 24, 2009, 9 pages.
Non Final Office Action for U.S. Appl. No. 10/631,366, mailed Feb. 2, 2007, 14 pages.
Final Office Action for U.S. Appl. No. 10/631,366, mailed Oct. 10, 2007, 17 pages.
Non Final Office Action for U.S. Appl. No. 10/631,366, mailed Jul. 17, 2008, 12 pages.
Notice of Allowance for U.S. Appl. No. 10/631,366, mailed Jan. 13, 2009, 10 pages.
Non Final Office Action for U.S. Appl. No. 10/668,455, mailed Mar. 20, 2009, 25 pages.
Non Final Office Action for U.S. Appl. No. 10/850,505, mailed Dec. 7, 2007, 14 pages.
Final Office Action for U.S. Appl. No. 10/850,505, mailed Jun. 12, 2008, 12 pages.
Notice of Allowance for U.S. Appl. No. 10/850,505, mailed Sep. 4, 2008, 6 pages.

Notice of Allowance for U.S. Appl. No. 10/850,505, mailed Jan. 14, 2009, 10 pages.
Notice of Allowance for U.S. Appl. No. 12/392,398, mailed on Apr. 29, 2011, 12 pages.
Notice of Allowance for U.S. Appl. No. 12/478,216, mailed on May 5, 2011, 9 pages.
Non-Final Office Action for U.S. Appl. No. 10/458,628, mailed on Apr. 28, 2011, 23 pages.
Final Office Action for U.S. Appl. No. 12/478,229, mailed on Jun. 29, 2011, 10 pages
Reexamination Documents for U.S. Patent No. 7,774,833, filed Jun. 27, 2011, 32 pages, included: Request for Reexamination Transmittal Form; Request for *Ex Parte* Reexamination; Form PTO/SB/08; Exhibit A—U.S. Patent No. 7,774,833.
"HP Procurve Series 5300XL Switches," Management and Configuration Guide, Hewlett-Packard Company, Edition 7, published Apr. 2003, 757 pages.
"Catalyst 2950 Desktop Switch Software Configuration Guide," Cisco Systems, Cisco IOS Release 12.1 (9) EA1, Apr. 2002, 544 pages.
"IEEE 802.1X Authentication for Wireless Connections," The Cable Guy, at URL: http://technet.microsoft.com/en-us/library/bb878016(d=printer)aspx, Apr. 2002, 6 pages.
Kwan, "White Paper: 802.1X Port Authentication with Microsoft's Active Directory," White Paper, Foundry Networks, at URL: http://www.brocade.com/downloads/documents/white_papers/wp-8021x-authentication-active-directory.pdf, Mar. 2003, ver. 1.0.0, 26 pages.
Singhal, "Understanding Wireless LAN Security: A Comprehensive Solution Through the ReefEdge Connect System," Reef Edge TechZone, copyright Nov. 2001, 18 pages.
Kwan, "Multiple Tiered Network Security System, Method and Apparatus Using Dynamic User Policy Assignment," U.S. Appl. No. 12/769,626, filed Apr. 28, 2010.
Kwan, "System, Method and Apparatus for Providing Multiple Access Modes in a Data Communications Network," U.S. Appl. No. 12/869,602, filed Aug. 26, 2010.
Non-Final Office Action for U.S. Appl. No. 10/925,155, mailed on Oct. 6, 2010, 55 pages.
Final Office Action for U.S. Appl. No. 10/925,155, mailed Apr. 6, 2011, 55 pages.
Non-Final Office Action for U.S. Appl. No. 10/458,628, mailed on Aug. 2, 2010, 24 pages.
Office Action for U.S. Appl. No. 10/458,628, mailed on Nov. 16, 2010, 26 pages.
Notice of Allowance for U.S. Appl. No. 10/631,898, mailed on Aug. 12, 2010, 21 pages.
Notice of Allowance for U.S. Appl. No. 10/631,898, mailed Dec. 7, 2010, 12 pages.

Non-Final Office Action for U.S. Appl. No. 12/769,626, mailed on Jul. 12, 2011, 47 pages.
Phaal et al., "InMon Corporation's sFlow: A Method for Monitoring Traffic in Switched and Routed Networks," Network Working Group Sep. 2001, pp. 1-29 available at http://www.ietf.org/rfc/rfc3176.txt.
U.S. Appl. No. 10/107,749, filed Mar. 26, 2002 in the name of Sunil P. Chitnis et al., entitled "Network Monitoring Using Statistical Packet Sampling".
Kwan, "IronShield Best Practices Management VLANs," White Paper, ver. 1.0.0, published Apr. 2003, 23 pages.
IEEE, "Part 3: Carrier sense multiple access with collision detection (CSMA/CD) access method and physical layer specifications," IEEE Std. 802.3 1998 Edition, 810 pages.
Order Granting Reexamination of U.S. Patent No. 7,774,833, for U.S. Appl. No. 90/011,769, mailed Aug. 26, 2011, 12 pages.
Non-Final Office Action for U.S. Appl. No. 90/011,769, mailed on Feb. 16, 2012, 25 pages.
Request for Inter Partes Reexamination for U.S. Patent No. 7,774,833, filed Nov. 8, 2011, 57 pages.
Notice of Inter Partes Reexamination Request Filing Date for U.S. Appl. No. 95/001,811, mailed Nov. 17, 2011, 1 page.
Notice of Assignment of Inter Partes Reexamination Request for U.S. Appl. No. 95/001,811, mailed Nov. 17, 2011, 1 page.
Non-Final Office Action for U.S. Appl. No. 95/001,811, mailed on Feb. 1, 2012, 21 pages.
Final Office Action for U.S. Appl. No. 10/458,628, mailed on Sep. 7, 2011, 26 pages.
Non-Final Office Action for U.S. Appl. No. 10/458,628, mailed on Nov. 2, 2011, 38 pages.
Non-Final Office Action for U.S. Appl. No. 10/631,091, mailed on Jul. 24, 2007, 8 pages.
Requirement for Restriction/Election for U.S. Appl. No. 10/631,091, mailed on Feb. 20, 2008, 4 pages.
Advisory Action for U.S. Appl. No. 10/631,091, mailed on Aug. 13, 2008, 2 pages.
Advisory Action for U.S. Appl. No. 10/631,366, mailed on Mar. 28, 2008, 5 pages.
Non-Final Office Action for U.S. Appl. No. 10/668,455, mailed Nov. 16, 2009, 25 pages.
Non-Final Office Action for U.S. Appl. No. 12/478,229, mailed Sep. 28, 2011, 9 pages.
Final Office Action for U.S. Appl. No. 12/769,626, mailed Oct. 24, 2011, 32 pages.
Non-Final Office Action for U.S. Appl. No. 12/827,235, mailed on Nov. 21, 2011, 39 pages.
Final Office Action mailed May 2, 2013 from U.S. Appl. No. 12/827,235, filed Jun. 30, 2010.

* cited by examiner

SYSTEM AND METHOD FOR SOURCE IP ANTI-SPOOFING SECURITY

RELATED APPLICATIONS

The present application is a continuation of U.S. application Ser. No. 10/850,505, filed May 20, 2004, now U.S. Pat. No. 7,516,487 (the '487 patent), issued Apr. 7, 2009, which is incorporated herein by reference for all purposes. The '487 patent is a continuation in part of U.S. patent application Ser. No. 10/631,366 filed Jul. 31, 2003, now U.S. Pat. No. 7,523,485 (the '485 patent), issued Apr. 21, 2009, which is incorporated by reference for all purposes. The '485 patent claims benefit from U.S. Provisional Patent Application Serial No. 60/472,158, filed May 21, 2003, which is incorporated herein by reference for all purposes, and also claims benefit from U.S. Provisional Patent Application Ser. No. 60/472,170, filed May 21, 2003, which is incorporated herein by reference for all purposes.

FIELD OF THE INVENTION

The present invention relates to a method of providing for enhanced security on a computer network to reduce the risk created by the spoofing of IP addresses.

BACKGROUND

As is widely known source IP Address spoofing is a common technique used in denial of service attacks (DoS). Other types of source IP address spoofing attacks are widely known, and include attacks such as distributed denial of service attacks (DDoS), Worm attacks, and Man In the Middle attacks. Spoofed Source IP Address attacks can also include Smurf attacks, NameServer attacks, and ICMP, IGMP, and UDP protocol attacks. One goal in some spoofing attacks is to spread a software virus to as many random new victims as possible, and other attacks are designed to overwhelm a computer system, and other attacks are used to steal information.

FIG. 1 shows a computer network 100 of the prior art. At the lowest layer (layer 1 of the OSI Networking protocols) is the physical layer which describes the actual physical elements such as cables and connectors which connect different devices of the computer network. The next layer of the system is the layer 2, the datalink layer. At this level, among other things, the MAC addresses are used to identify the devices which are interconnected on a subnet. As is widely known a MAC address is a unique address which corresponds to a device connected to a network. The MAC address is generally determined by the Ethernet board of a device which is connected to the network.

The computer network 100 can have a number of subnets. As shown in FIG. 1, the subnets are 102, 104, 106, and 108. Each subnet can contain a number of layer 2 devices such as switches. For example, subnet 102 is shown as having switches 110-126, and subnet 104 is shown as having switches 128-134. The layer 2 devices are not shown for subnets 106 and 108, but as one of skill in the art will appreciate, most subnets will include a number of layer 2 devices such as switches or hubs. Each switch can have a number of ports to which additional switches can be coupled, or to which host devices such as end user computers, or serves, or mainframes can be connected. At the subnet level different devices are connected to the subnet and can communicate with other devices on the subnet by transmitting data packets through the switches. These data packets include the MAC address for the device to which the data packet is to be sent (the destination MAC address) and the MAC address for the host which is sending the packet (the source MAC address). In addition each host device will be assigned an IP address. The IP address is utilized by a router 136 to determine routing for data packets which are being sent by a host on one subnet to a host on a different subnet, or to a different device which may require that the packet be transmitted via the Internet 138. The IP address is often assigned using the Dynamic Host Configuration Protocol (DHCP). Each host on a subnet will normally be assigned an IP address. As is widely known data packets generated by a host on the subnet can include information which is being sent from one host to another host, and further these data packets will include MAC addresses as described above, and a source IP address and a destination IP address.

Source IP spoofing occurs when an attacker host uses a source IP address, which does not correspond, or is not assigned, to its MAC address, in a transmitted data packet. For example, the attacker host may select a source IP address for a different host on a different subnet and transmit a data packet with this false, or spoofed, IP address. This data packet would then be received by the destination device, and the destination device would read the spoofed IP address and it would appear to the destination device that the data packet had come from the device which is actually assigned the source IP address which was used by the attacker host.

In terms of network security defenses, traditional blocks to this type for source IP spoofing were to create inbound filters on the router ports 140-146 that supported the subnets 102-108. The router filter operates such that it knows which IP addresses should be received from a specific subnet connected to the particular port. This allows ISP's and enterprises to block randomly spoofed source IP addresses, where the spoofed IP address received on a particular port of the router, is not consistent with source IP addresses for the subnet which is coupled to the particular port of the router. Hackers have recognized the limitations inherent in this type of source IP address anti-spoofing process, and developed spoofing software tools, some of which are referred to as "zombies, and "bots" which now spoof source IP addresses from within their own subnet and subnet mask settings. For customers with large class B subnets, the router level (layer 3) type of defense is not very effective as hundreds and potentially thousands of hosts on the subnet can still be affected.

An Automatic Spoof detector (referred to as "Spoofwatch") has been developed in an attempt to efficiently detect hosts performing source IP spoofing. Spoofwatch works on the premise that these hosts do not respond to ARP requests for their spoofed IP addresses. This solution has many potential shortcomings. For example, the router 136 can receive very large numbers of different source IP addresses in different data packets. Thus, a very large amount of router's processing power is consumed with generating the ARP requests and monitoring the responses.

A review of a number of different websites related to networking showed a number of different approaches related to preventing IP address spoofing, but each approach was very different than that discussed herein. Other techniques have been developed for providing defenses against source IP address spoofing. One of these other approaches relies on using encryption, and source IP filtering at the layer 3 level, which is after the data packets have been transmitted from the subnet to the router.

Additional information regarding different approaches to combating source IP spoofing can be found at http://www.cisco.com/en/US/tech/tk86/tk803/technologies_tech_note09186a00800a7828.shtml. Additional websites provide discussion regarding the risks associated with source IP address spoofing and provide some discussion for ways to combat spoofing, see for example: http://www.sans.org/rr/threats/spoofed.php; http://www.cert.org/incident_notes/IN-2000-04.html; http://www.anml.iu.edu/PDF/Automatic_Spoof_Detector.pdf; and http://www.linuxgazette.com/issue63/sharma.html.

In order to increase the efficiency and effectiveness of combating source IP spoofing it would be beneficial to provide source IP spoofing at lower level in the network hierarchy, in a manner which has not previously been provided.

DETAILED DESCRIPTION

One approach to improving defenses against Source IP Spoofing is to attack the problem at the subnet or Layer 2 level. Because ISP's and Universities have been hard hit with spoofing attacks, a feature that stops Source IP Spoofing at the Layer 2 subnet level provides a number of advantages. ISPs and Universities frequently have very large subnets, and as a result, utilizing defenses against spoofing at the router lever can consume an inordinate amount of the router's processing power. In the past networking devices, such as switches, at the subnet level did not analyze source IP addresses in data packets sent by hosts on the subnet, and in particular it is believed that networking devices at the layer 2 level did not analyze source IP address information in data packets to provide anti-spoofing security procedures based on an analysis of source IP address information in data packets transmitted by hosts on the subnet. Some layer 2 switching devices did provide for some security on ports of the switch, where the source host MAC address was used on an inbound filter on the port to which the host was connected. However, this MAC address type of port security did not provide effective protection against a host attacker that was spoofing source IP addresses.

Figure 1:
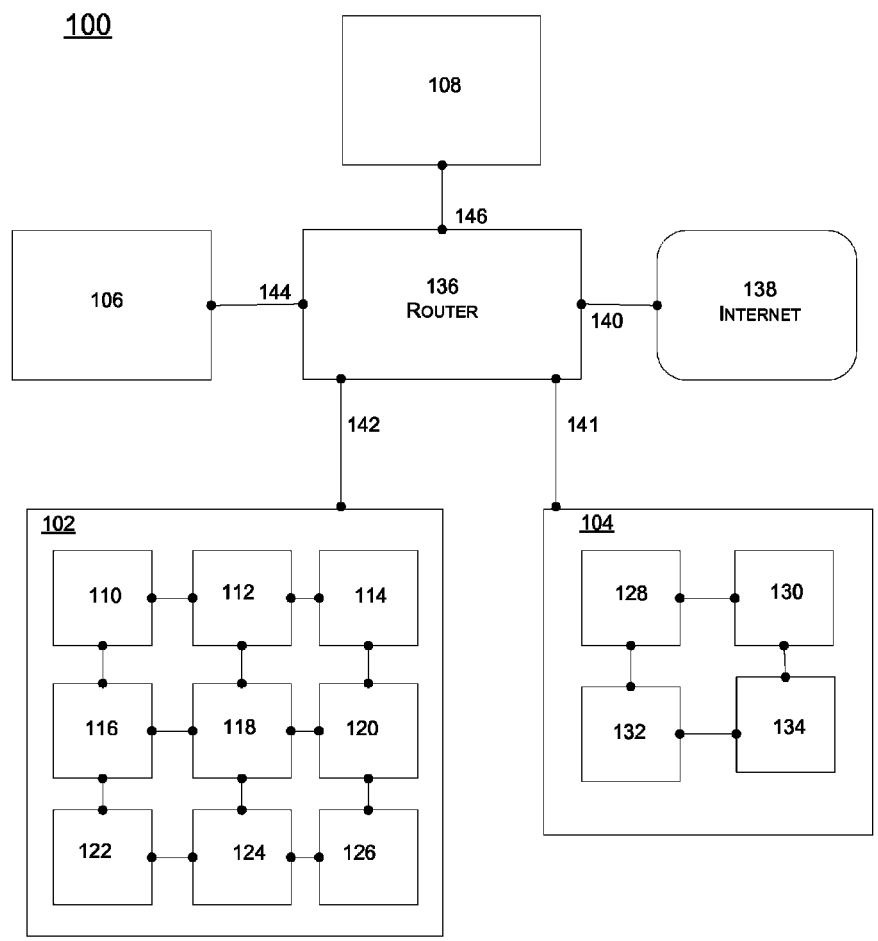
FIG. 1 shows an overview of a system of the prior art.
Figure 2:
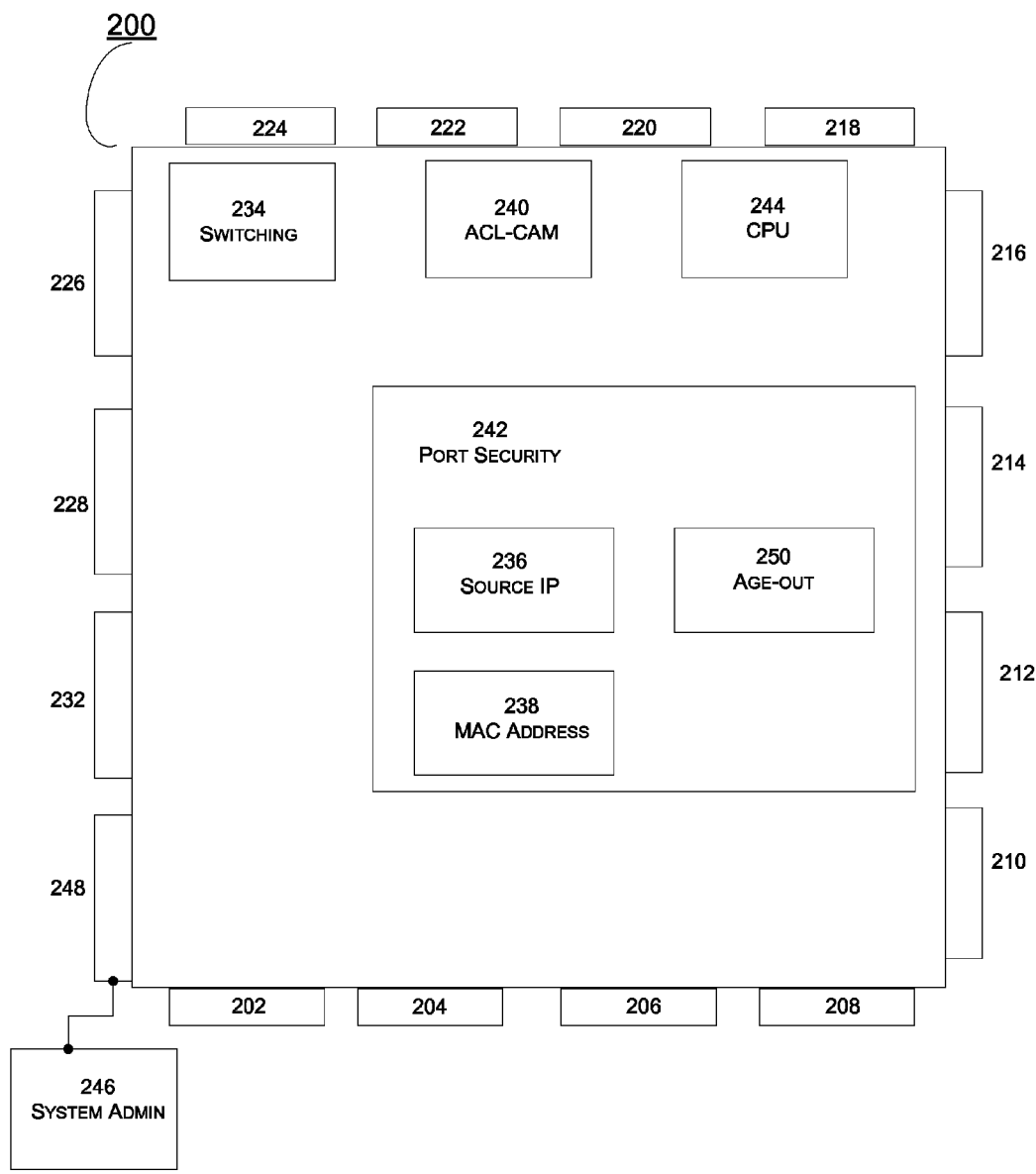
FIG. 2 shows an embodiment of a network device of the present invention.

FIG. 2 shows a view of an embodiment of a network device 200 of the present invention. This network device provides some layer 2 switching functionality where the MAC addresses of different hosts coupled to the subnet are utilized in applying switching procedures and identifying different hosts on the subnet. The network device includes a number ports 202-232. End user host devices (not shown) such as personal computers can be coupled to these ports 202-232, and it is possible for other network devices such as hubs or additional switches to be connected to a port of the network device 200. A subnet could include one of the network devices 200, or could include a large number of network devices 200 coupled together and connected with a large number of hosts to form a large subnet. The operation of the network device 200 allows for passing data packets received on a port through the network device switching 234 and then transmitting the received data packets through a different port, such that the data packet is transmitted to an intended destination device.

The basic switching operation of such a network device is well known. The network device 200 contains a processing device which operates to analyze data packets received on a port to identify the MAC address of the host sending the data packet. Each data packet can include at least the MAC address of the device sending the data packet (source MAC address) and the MAC address of the device to which the data packet is to be sent to (destination MAC address). As discussed above each host on the subnet can also have an IP address. In the past where one host device on a subnet is sending data packets to other host devices on the same subnet, a switching device would refer to a MAC address look up table to determine which port the destination host was on, and the data packet would be transmitted through the port which is connected with the destination host. A typical layer 2 switch would not analyze the source IP address in connection with this switching function, and would not use the source IP address to provide source IP anti-spoofing operations.

In the network device 200, however, additional functions are provided which allow for utilizing source IP address information. As described herein much of this additional functionality is described in connection with a port security processor 242. Functions of the port security processor can be implemented in a single processor, which is programmed to provide a number of different functions, or aspects of the functions of the port security could be implemented by different processors which work cooperatively to provide the functions herein. As shown in the embodiment of FIG. 2 the port security processor 242 includes a MAC address detector 238 which detects when a new host has been coupled to one of the ports 202-232 of the network device 200; the MAC address for the new host is stored in a table which correlates the MAC address for the new host with the port to which it is coupled. In one embodiment, this MAC address table would be stored in an ACL-CAM discussed in more detail below. In addition when a new MAC address is identified, a source IP address detector 236 operates to identify the source IP address which corresponds to the MAC address for the new host. This source IP address and the corresponding MAC address are then stored in the table such that each MAC address and source IP address is correlated with each other as a source IP address/MAC address pair.

The table which stores the IP address/MAC address pairs can be implemented using a number of different devices. In the embodiment shown in FIG. 2 the table is embodied as an access control list, which are data fields, included in a content addressable memory 240, which is referred to as an ACL-CAM. By utilizing a content addressable memory where the functionality of the memory is determined by hard wiring (as opposed to a CPU which requires the loading of software), the switching of the of data packets is done at a very high speed, and once the MAC address has been determined and the source IP address has been learned, a CPU 244 of the network device 200 is able to operate to monitor and control other aspects of the of the operation of the network device, and the ACL-CAM will control access and switching through the ports.

Some prior switches allowed for initially learning source IP addresses for MAC addresses, however, these prior switches were not used for protecting against source IP address spoofing. One limitation of utilizing a prior switch was that these were not designed to allow for the fact that source IP addresses are generally not static, so the source IP address for a MAC address can change over time.

In the network device 200, the source IP address detector 236 automatically learns the source IP address for each MAC address entering a port of the network device 200. The port security processor 242 of the network device 200 also provides for dynamically adjusting inbound source IP address anti-spoofing blocking criteria for each port, and a system administrator can specify how many devices or IP addresses to permit per port of the network device 200. For example, the port security processor 242, can be programmed to receive input from a system administrator's computer 246, which can be coupled to the network device 200 by a secure port 248, and to provide information to the system administrator's computer 246. Using the ability to input commands to the network device 200 a system administrator can control aspects of the port security operation, as well as other aspects of the operation of the network device 200. For example, the system administrator could control the maximum number of source IP addresses which are learned from a port, and the network device 200 would reject any data packets with new source IP addresses that exceed the maximum number.

In one embodiment, the port security processor 242 will periodically poll ports for the learned IP addresses which are stored in the table to ensure that the host devices with the learned source IP addresses are still coupled to the port. If it is determined that a host device having the learned source IP address is no longer coupled to a port then source IP address for the host that is no longer present can be removed from the table so as to allow a new source IP address to have access on the port.

The network device 200 extends port security features beyond the MAC address filtering procedures that were used in prior layer 2 devices. The port security processor 242 allows source IP anti-spoofing protection to be activated selectively on a port-by-port basis. The port security processor 242 uses the source IP address detector 236 to automatically learn the source IP addresses for each host device attached to the port. To determine if the data packets received at a port contain a new source IP address that has not been learned, the ACL-CAM compares the source IP address and the MAC address in a received data packet, with the table of IP address/MAC address pairs.

When a new MAC Source Address is detected on a port by virtue of a received data packet identifying a new MAC source address, the source IP address detector 236 learns the association of source MAC address and the corresponding source IP address, Once the pair is learned, the ACL-CAM 240 is programmed with the information and switching of the network device proceeds to switch data packets normally.

The source IP address detector 236, can learn the source IP address for a host in a number of different ways. For example, the source IP address can be learned by using a reverse address resolution protocol (RARP) which provides for sending out the MAC address on the subnet, and in response an RARP server sends a data packet to identify the IP address which corresponds to the sent MAC address. Thus, listening to the RARP server communications can provide one way for determining a source IP address and MAC address pair. The source IP address detector 236 could also learn the IP address for a host by listening to the DHCP response packet being returned to the host. This response contains the source TP Address for the host. When a DHCP packet is detected, the entry in the table for the MAC address receiving the DHCP packet with a source IP address is cleared and the source IP address provided in the DHCP packet is loaded into the table. This utilization of the DHCP response works well where the port is set to allow for one IP address. It should be noted that if a port is set to allow for more than one IP address for the port, then relying on the DHCP response alone may be insufficient, as the DHCP response may not allow for an unambiguous correlation of the source IP address to the correct MAC address. However, this ambiguity could be resolved if the DHCP request and the DHCP response were both tracked. Another technique provides for watching for the IP header information in a data packet when the host first transmits a data packet through a port. If a static IP address is used and the port is set to 1 IP Address, the user can unplug the cable (causing a link down) to reset the table, or a timer can be used to clear the table. Another technique provides for trapping (listening to) ARP requests and ARP reply messages to learn the source IP address and MAC address pairs, and storing the pairs in ACL-CAM for each port.

In addition to the above, it should be recognized that care must be taken to learn the correct source IP address. For example, in order to support delayed technologies, such as the widely known IEEE 802.1X standard which may postpone IP Address assignment until the port is authenticated, a tiered, or delayed, approach is required to successfully detect the source IP address. This approach could allow for first identifying the MAC address and then waiting for an appropriate amount of time to learn the correct IP address. It is important to avoid learning the IP addresses assigned by Microsoft or Apple operating systems which may be provided to a host when a DHCP server cannot initially be found. It can be advantageous to delay IP address learning process until a certain amount of traffic has passed through the port. Further the risk of possibly learning the wrong IP address can be reduced by allowing an system administrator to seed the IP learning process with the IP address properties that are consistent with the subnet to which the host is coupled. For example, if the IP Subnet is 10.32.1.0/24, then this information can be used to seed the IP learning process and only match a MAC address with an IP addresses consistent with the subnet 10.32.1.0/24 addresses. This will eliminate false learning of a default 169.0.0.0 addresses assigned by Microsoft or Apple operating systems when a DHCP server is not initially located. It is also advantageous to confirm that the learned IP address is correct by performing a reverse IP check.

Once the learned IP address has been confirmed, and the IP address/MAC address pair has been stored in the ACL-CAM, blocking procedures are applied to the port. If there is more than one host device allowed per port, this process of determining MAC address and source IP address pairs will be repeated for each learned IP address on the port. Once a new source IP Address is confirmed, the inbound blocking procedures are applied to the port and includes the new source IP Address. Additional MAC address and IP address pairs will continue to be learned until the maximum number of MAC and IP Addresses is reached. The source IP anti-spoofing procedures should be compatible with existing MAC address port security and 802.1X Port Authentication features. In order to provide for compatibility the following order of execution can be used. First, MAC address port security is utilized, which confirms that a MAC address present on a port is a valid MAC address, and if it is not MAC port security procedures block data packets from the invalid MAC address. If 802.1X Port Authentication is enabled, the user will be prompted for the 802.1X user credentials to authenticate the port and either permit or deny data packet traffic based on the success or failure of the IEEE 802.1x authentication process.

Source IP Security is then used, if enabled, to check if the maximum number of source IP addresses has been learned for a port. If the maximum number of source IP address has not been learned for the port, then the source IP address will be learned and confirmed, and the pairing of the source IP address with MAC address will be set in a table.

In order for the blocking to be efficient and fast, it should be implemented in hardware, such as a CAM, as opposed to using a CPU where the operation would be slower. The source IP anti-spoofing methods can provide for different types of security. For example, one aspect of the operation described herein provides for allowing an system administrator to set a maximum number of source IP addresses for a port. By limiting the number of the source IP addresses which can transmit data packets through a port of the network device 200, the risk of certain types of spoofing attacks (such as DoS attacks) can be prevented. This aspect of the operation provides for blocking of data packets at the port of the network device based on the source IP address contained in the data packet. For example, by limiting the number of source IP addresses on a port, an attacking host could only use a limited number of spoofed IP addresses before the maximum number of source IP addresses for the port would be exceeded.

A second operation of the network device 200 blocks data packets at the port, where the data packet contains a source MAC address and source IP address pair which does not match one of the previously identified MAC address/IP address pairs stored in the table. In this operation, a host device which is attempting to use a source IP address which does not match the correct source IP address for the MAC address will be blocked at the port. This second part of the operation provides for a high level of security against source IP spoofing attacks.

It should be noted that embodiments of the methods and systems herein can be provide for a significant amount of flexibility, which can provide a system administrators and ISPs with a powerful tool to combat source IP spoofing. For example, as discussed above, in one embodiment the number of source IP Addresses which can be associated with each switch port can be selected by an administrator. If more than one source IP address is permitted per port, then source IP spoofing is possible if the attacking host is using a validated MAC address, unless the source IP Security process as been activated to provide for port access based on correlating the learned source IP Address to its MAC address, such that access on a port is blocked, or permitted, based on the matching of the MAC/IP address pair in a received data packet with a MAC/IP address pair stored in a table. It should be recognized, however, that even without providing security based on the MAC/IP address pairs, some degree of protection against Source IP spoofing is provided by allowing the number of source IP addresses on the port to be controlled.

The port security processor 242 can also include a source IP age out timer 250. The port security processor 242 can allow an administrator to specify a time period for a source IP age-out timer. This timer can clear the ACL-CAM, or other possible table, of source IP addresses, every n seconds to allow the network device 200 to support downstream hubs and switches for multi-host configurations. If a timer were not provided then source IP addresses which were previously on the port might prevent new source IP addresses from gaining access to the port, where the maximum number of source IP addresses would be exceeded. In short, it would not be practical to maintain a link for a source IP address indefinitely. Where an administrator did not want to have a time out entry they could specify a zero "0" for the timer, and a default of 60 or 120 seconds or other appropriate time could be provided.

Additionally, or alternatively, the source IP age out timer could also be flow based, which would provide that if the flow stops for a source IP address, for a period of n seconds, then the source IP address can be removed (aged out) from the table.

An embodiment of the system and method can also provide for capturing the information when a possible IP spoofing attempt has occurred. This information could then be used to generate syslog messages which could be transmitted and recorded in a log to record information regarding the operation of the system, including possible IP spoofing attempts.

As shown by the discussion above, it is important in many applications of the source IP security operations herein, that the table containing the learned source IP addresses be dynamic, such that the table can be updated so that timed out source IP addresses can be removed and new learned source IP addresses can be added to the table. Further, being able to change entries in the table allows for the fact that the source IP addresses assigned for a given host can change over time. This means that when the learned source TP addresses are stored in an ACL-CAM, these addresses should not be saved when a write only memory operation is performed.

The port security processor 242 should be programmed such that an administrator can view the source IP addresses learned and/or assigned to the port. Further, the IP security device should allow and administrator to view the setup and configuration of the timers and source IP address ACL's. The port security processor 242 should provide commands which allow an administrator to clear a single entry from the table, and to allow the administrator to clear all entries from the table. Further, debugging tools may also be provided to allow administrators to troubleshoot the security procedures for their particular environments.

Figure 3:
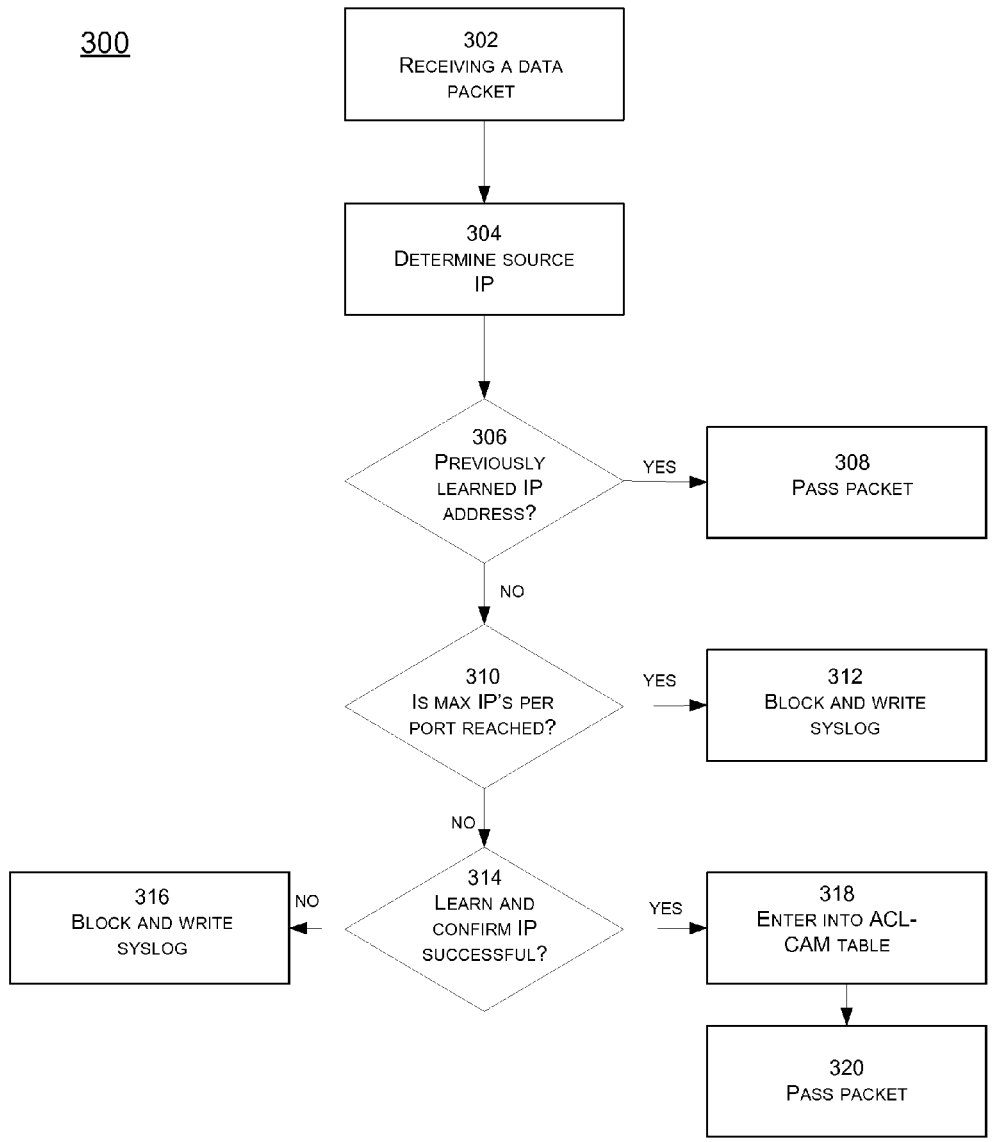
FIG. 3 shows a method of an embodiment of the present invention.

FIG. 3 is a flowchart showing a method 300 of an embodiment of the method herein. The method provides for receiving 302 a data packet from a host on a port of the network device. The data packet is analyzed 304 to determine its source IP address. The determined source IP address is then compared 306 with the source IP address, or addresses, which have previously been learned and stored in a table as source IP address which is permitted access to the network through the port. If it is a previously learned IP address then the data packet is passed 308 through the port. If it is not a previously learned source IP address, then it is treated as a new source IP address. Once it is determined a new IP address is on the port, then it must be determined 310 if the maximum number of source IP addresses are present on the port. If the maximum number of source IP addresses are present on the port, then the data packet with the new source IP address is blocked 312 and the information relating to the blocking of the port is transmitted in a trap and syslog message. If the maximum number of the source IP addresses are not present on the port, then a learn source IP routine is performed 314 (various methods related to this are described above). Typically the learn source IP routine will include doing a reverse IP check to confirm the source IP address. If the confirmation or learning of the source IP address fails then the data packet containing the new source IP address is blocked 316 and syslog message can be generated. If the learning and confirmation of the new source IP address is successful, then the new source IP address is stored 318 a table indicating that the new source IP address is permitted access through the port. As discussed above this storing of the new source IP address in a table, can include storing the information in an ACL-CAM. Further a syslog message could also be transmitted in connection this operation. At this point the data packet with new source IP packet can be passed 320 through the port. Further, an additional operation not shown in the flow chart includes the operation of the age-out timer which would provide for removing previously learned source IP addresses which are stored in the table and determined to no longer be present on the port.

In general in connection with the reverse IP checking described above, this type of operation may also be referred to as source IP checking. It should also be recognized that in some embodiments some source IP addresses will be statically configured. Where a source IP address is dynamically mapped, the source IP check can be done by sending out an ARP request to the host. If the response comes back and matches with the MAC address previously learned then the source IP check is successful. If the MAC address does not match then the source IP check has failed.

Figure 4:
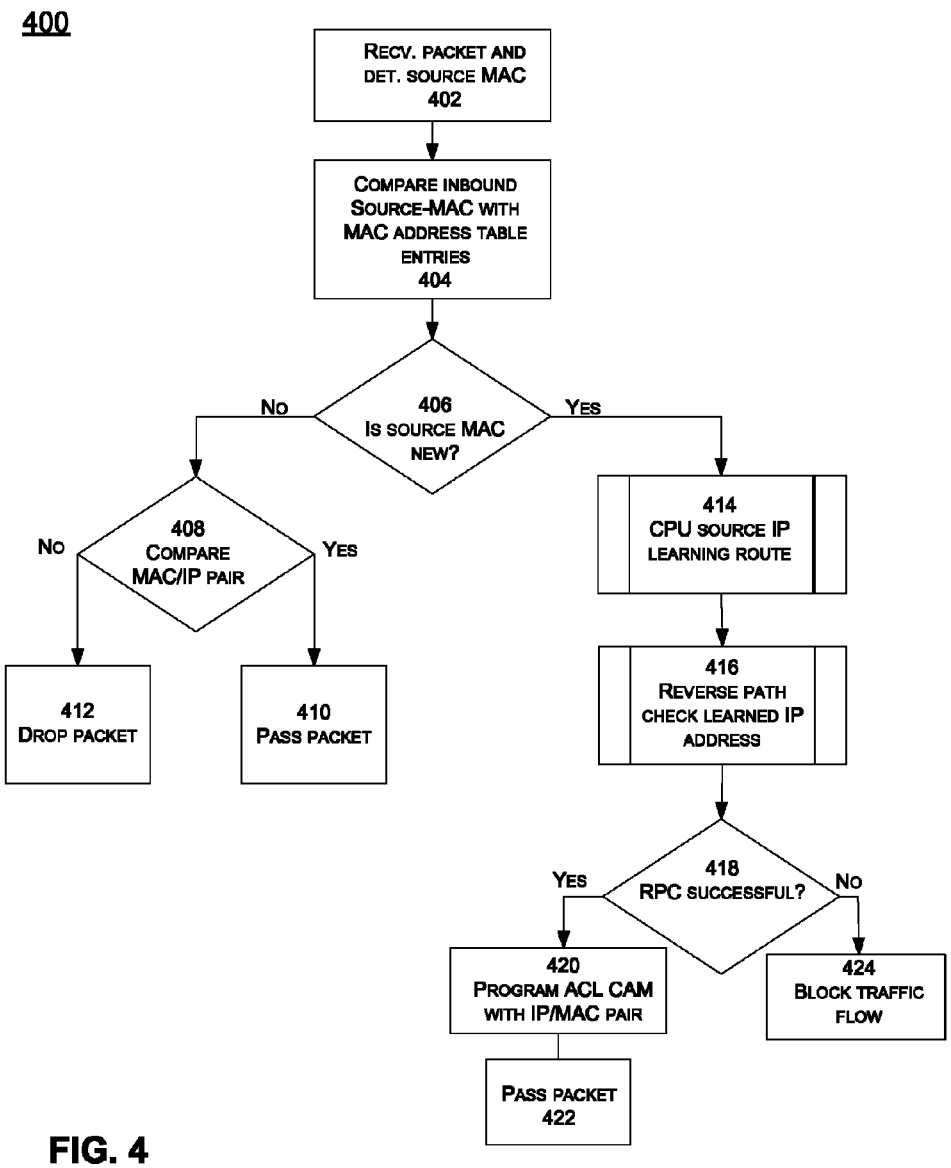
FIG. 4 shows a method of an embodiment of the present invention.

FIG. 4 shows a method 400 of another embodiment of the invention. The method 400 provides for receiving a data packet on a port and determining its source MAC address 402. The determined source MAC address is compared 404 with MAC addresses shown in a table 404. A determination 406 is made as to whether the source MAC address is new, which would mean that it is not in the table. If the source MAC address was previously stored in the table, then the source IP address and MAC address pair for the received data packet is compared 408 with the source IP address/MAC address pairs in the table. If the pair for the received data packet is found in the table then the received data packet is passed 410 through the port. If the pair for the received data packet is not found in the table, then the received data packet is blocked, or dropped 412 at the port.

If the received data packet at the port has a MAC address which is new, then the source IP address for the received data packet is learned 414 using one of the processes described above. After the source IP address has been learned, a reverse IP check 416 is done to confirm the source IP address. If the reverse IP check is successful 418, then the table is programmed 420 with the IP address/MAC address pair, and the packet is passed 422. If the reverse IP check is not successful then the received data packet is blocked 424, or dropped at the port. It should also be recognized that some computers, or host workstations, may have firewalls which do not do not respond to RARP, or ICMP, or some other reverse IP techniques. Thus, in these situations the data flow from a host can be monitored to validate that the host is utilizing the proper MAC/IP address pair.

An embodiment herein provides for network device which includes layer 2 switching functions, where the switch provides for protection from spoofing of the Source IP address. The valid set of IP hosts, or subnets, can be configured statically, or learned dynamically by looking at the address information from various protocols, such as ARP and RARP, as discussed above. There can be provided two phases to the learning of the host addresses: the learning from the different control or data packets, and then validation of the learned information. Once the learned addresses are validated, the data packets from the validated source IP addresses will be forwarded. If the port security is enabled on the port then all other data packets from different source IP address will be dropped.

Figure 5:
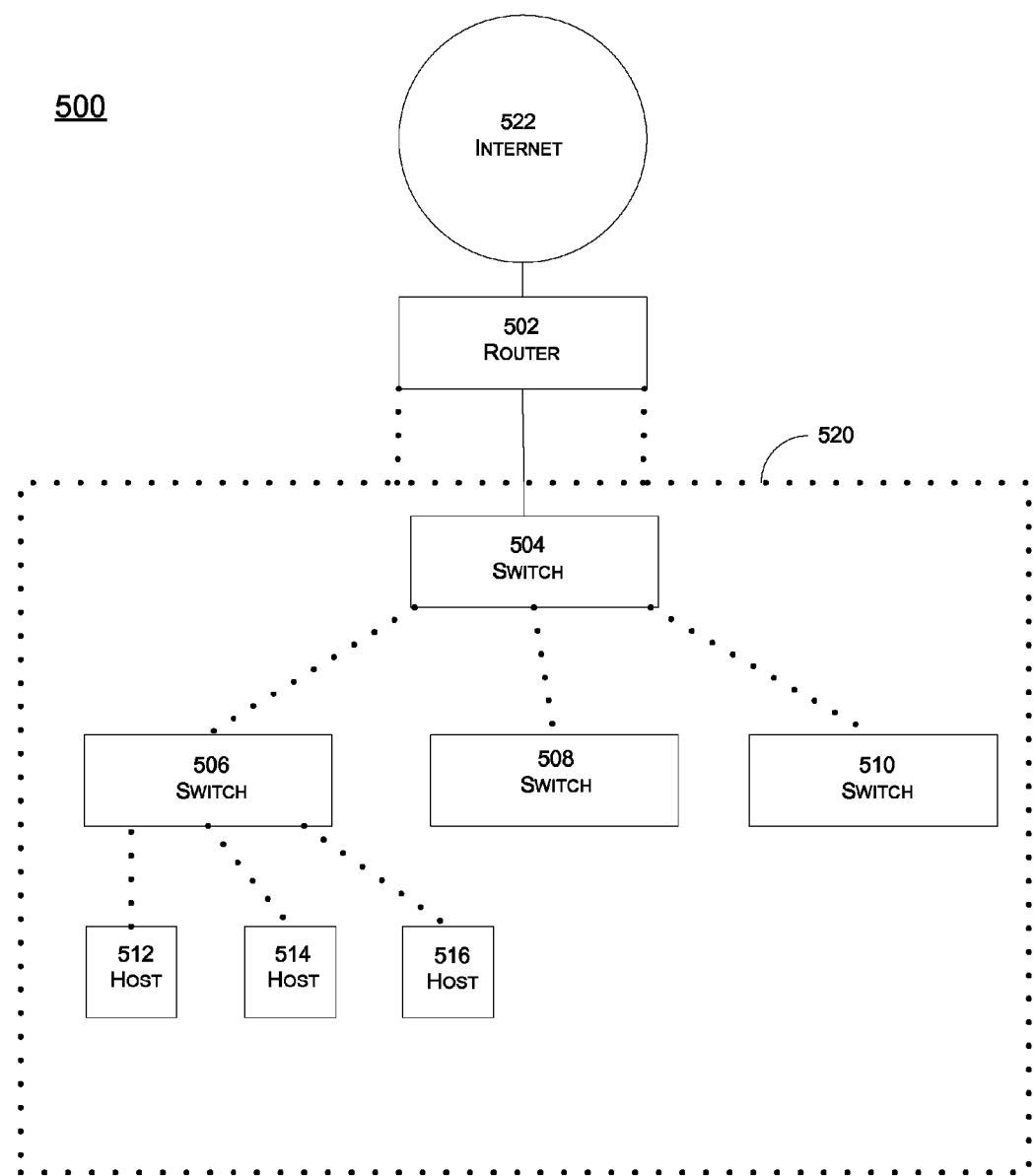
FIG. 5 shows an embodiment of a system herein.

The security functions of an embodiment herein can be particularly advantageous when implemented on edge switches, or a riser switch feeding off from the edge switch, where the edge switches or riser switches are network devices that provide connectivity to different hosts connected to the subnet, and the data packets received by these switches contain both source IP and MAC addresses. This is illustrated in FIG. 5. FIG. 5 shows a system 500 of an embodiment herein. The router 502 operates to receive data packets originating in the subnet 520. The router 502 can receive data packets being transmitted through switches 504-510 of the subnet 520. These data packets received by the router 502 will contain both a MAC address and a source IP address, so it is possible to implement the source learning and validation at the router 502 for data packets which are outgoing from the subnet 520. However, it should be noted that it can be very advantageous to implement the anti source IP spoofing functions at switches which are directly coupled to the hosts. The advantage of moving this process closer to the hosts is that the potential spoofed IP attack could be stopped essentially at the very port to which the attacking host is connected. Switch 506 is shown as having hosts 512-516 connected to ports of the switch. In fact there many implementations there could be hundreds or thousands of hosts connected to switches of the subnet.

In light of the above, it should be recognized that the anti-source IP spoofing function herein can advantageously be implemented on ports of the switches, as opposed to waiting to implement these functions at ports of the router. It should be noted that in implementation where a particular switch is not implementing anti source IP spoofing functions, then the router may need to do its own reverse source IP checking and validation, and further it will be recognized that a layer 2 switch will not be able to validate a host's source IP address when the host is connected to the system such that a router is positioned between the host and the layer 2 switch. This is because the layer 2 switch would typically see the MAC address of the router, rather than the MAC address of the host.

The Source IP Anti spoofing functions herein can co-exist with existing CAM-ACL features, such as, Flow Based functions, and Rule Based ACL functions, where flow based controls call for specific policies to be applied on host by host basis, and a rule based approach can allow for general or specific rules to be applied to groups of hosts, or ports. The implementation of the Source IP anti-spoofing functions can be done such that it is compatible with other features which can be provided in a network device, these features can include MAC address filtering; 802.1X port authentication; dynamic VLAN configuration; and dynamic user policies. Thus, the system and method herein allow for the learning and validation of source IP addresses, and for dynamically binding policies with the learned source IP addresses. Further, the filtering herein can be implemented in hardware, and can be applied to both dynamically learned source IP addresses and to statically assigned source IP addresses.

An embodiment herein can provide for generating system log information which records events regarding the learning and validation of source IP addresses. The learning and validation of the source IP addresses as well as the generation of system log information can consume the switches CPU processing power. Thus, in some applications it may be beneficial to provide additional features which will further reduce the amount of CPU processing required to implement the anti-source IP spoofing functions herein. One embodiment could provide a mirroring operation where information which would otherwise be processed by the CPU can be mirrored (transmitted) to another processing device which can share some of the processing demands with the CPU of the switch.

An additional aspect of the learning and validating the source IP addresses, is that controls and policies can be implemented not only on data packets coming into the switches, additionally outgoing policies can be applied on data packets being transmitted from a port. For example, a specific source IP address may be blocked from transmitting data packets through certain specified ports of the switch. An embodiment herein can also apply rate limiting policies, where the number of data packets transmitted to a particular host during a given time frame can be limited.

The source IP address for hosts connected to ports of a switch can be either statically configured, or learned dynamically. The learning of source IP addresses can provide for looking at the control packets, such as, ARP, RARP, DHCP, BOOTP, ICMP, etc. After the source IP address is initially learned the source IP address can be validated using RARP or ICMP procedures. Once a learned source IP address has been validated, the source IP address will be programmed into a CAM-ACL, and can be utilized in connection with layer 4 features that use the CAM. For example, these features can include rate limiting on certain ports, rate limiting for certain hosts, and providing for application control. Further as was the case with the above references to Layer 2 and Layer 3, Layer 4 is another functional layer of a network identified and discussed generally in the International Standards Organization, standard ISO/IEC 7498, which defines a 7-layer model for describing interconnected systems. It is referred to as the Open Systems Interconnection (OSI) model, and is incorporated herein by reference in its entirety. The Layer 4 is the transport layer which provides for transfer of data between hosts and flow control. Additional aspects of the learning of source IP address and L4 CAM programming are discussed below.

In many instance it will be desirable to assign certain hosts or devices of a network system with a static source IP address. A source IP address can be statically configured by an administrator of the system using a command line interface (CLI) of the network device. Examples of devices where is would be beneficial to provide a static IP address could include an application server, or database server, or source IP addresses for different network devices such as the switches or routers.

For dynamically assigned source IP addresses a number of different options can be used to determine the source IP address for a host. One of these options is to perform snooping of ARP requests. This snooping of ARP requests means that the switch will listen to ARP requests which are transmitted by hosts of the subnet, and then to the response to the ARP requests, and this response will include the MAC address and the source IP address for a host. After initially learning the MAC address and the source IP address for a host, the switch will probe or ping the host using ARP or ICMP to receive a confirmation that the host is actually responding to data packets sent to the learned source IP address. Once this has been confirmed, or validated the switch will identify the learned source IP address as valid, and record the Source IP address and corresponding MAC address in the CAM-ACL. During the transient state, which occurs after initially learning a new source IP address but prior to confirming the source IP as valid, the switch will continue to forward data packets with the new source IP addresses for the period of time, during which the validity of source IP addresses is being confirmed. If the source IP address is not confirmed as valid within a designated time period, then subsequent data packets having the new source IP address which has not been confirmed as valid will be dropped.

Another option for learning dynamically assigned source IP addresses, utilizes the fact that, in some systems, on boot-up a host on the subnet sends RARP broadcasts with its MAC address, and a RARP server responds with the source IP to be used by the host having the MAC address in the RARP broadcast. By listening to the RARP response from the RARP server, the source IP address can be learned by monitoring the RARP response on the port where the corresponding host having the corresponding MAC is coupled.

As discussed above the data packets from the DHCP server can also be analyzed to determine the assigned source IP address. The operation of some computer networks provide that a host and a DHCP server exchange DHCP messages by which the DHCP server assigns an IP address to the host. In such a network, the network device, switch, of the present invention with the source IP protection enabled, can listen to the DHCP messages and learn the IP address assigned to a host by the DHCP server.

Some systems will utilize BOOTP data packets; and the general operation in connection with BOOTP data packets is the same as for the DHCP operation. In the BOOTP systems on boot-up, a host sends a bootp broadcast message with its MAC address. The Bootp server responds with the IP address for that MAC address. By snooping into (analyzing) the BOOTP server response the IP address can be learned for that particular port on which the MAC address was learned.

Additionally, the source IP address can be learned by temporarily retaining a data packet transmitted by a host, and then generating an ARP request and waiting for an ARP response from the host to confirm the source IP address.

As discussed above the system and method herein also provide for monitoring an aging of the source IP address. A method of an embodiment herein would provide that statically configured Source IP Addresses on the subnets are never aged out. These static source IP addresses would be removed when they have been removed from the subnet configuration. For dynamically assigned and learned source IP addresses, the method can provide for aged source IP to be removed.

Layer4 CAM Programming

The network device can provide two variations for the layer 4 (L4) CAM-ACL programming. One of these variations provides for rule based control where groups of source IP addresses are provided with rule defined access through the network to other addresses. A second variation, is a flow based model where specific source IP address are provided with certain flow protocols determined on a source IP address specific basis. An embodiment herein provides for programming a Layer4 CAM-ACL entry with the source IP as one of the specified addresses on the port. In one implementation there is support for the Rule based CAM-ACL programming using hardware filtering, features such as TOS/DSCP honoring (e.g. providing a specified quality of service QOS or type of service TOS), marking (such prioritizing traffic or packet types), and rate limiting. (DSCP stands for Differential Service Code Point. It is a 6 bit value in an IP header that can serve as a quality of service information for the switch, and it can be advantageous to allow the network device to change the value of the DSCP).

In the absence of any specific ACL bound rules applied to the port, the switch will be programmed for a session entry to forward all the IP traffic with the validated source IP addresses, and deny all other source IP traffic. This rule would typically be applied for every new IP source learned on the switch.

In the Layer4 CAM programming, there is an implicit Source IP/Subnet clause for the configured or learned source address of the trusted subnet. The extended ACL will not have a source <clause> of its own for a port that is configured with this feature. Thus, where a source IP and MAC address pair has been learned and verified then groups of ACL rules or clauses from the CAM can be applied to the learned source IP address.

Rule Based ACL

When a rule based ACL group using extended ACL is configured, rules which are pre-programmed into the CAM can be applied to learned and verified addresses. The extended ACL can operate to provide a number of functions, including operating to restrict application services. This programming can then be repeated, or updated, with an implicit permit Source IP clause for each secured host source IP address. A secured host source IP address could be a source IP address which has been learned and validated or it could be a statically assigned source IP address.

In one embodiment if the Source IP addresses are configured statically, whenever an ACL clause (e.g. a policy rule) is bound to a port, the system will program the clauses with an implicit Source IP permit clause. Once the ACL entry for the statically configured address is unbound from the port, the CAM associated with the ACL entry will be removed. Thus, in this manner IP/MAC address pairs can be removed from the CAM-ACL.

In one embodiment, for a dynamically learned source IP Address, the system will have to re-program all the ACL clauses for each Source IP Address learned with an implicit source IP permit clause added to them. If the protocol mechanism (such as the validation process) or aging process, decides that a dynamically source IP address is not to be used any more, the specific Source IP address is removed from the ACL, which can make space available for a new source IP address.

Statically Configured Addresses

When the secured hosts are statically configured, the host addresses are programmed in the CAM and only traffic from these statically configured addresses are permitted on the configured ports. All other IP traffic is dropped. The learning control packets such as DHCP, BOOTP will still be processed and forwarded via the CPU of the switch. The L4 CAM-ACL for the statically configured host address will reside in the bank that gets matched prior to the Rule CAMs.

If there is a conflict between the statically configured addresses and the Rule based ACL, the statically configured addresses will take precedence. In such cases, it may be desirable to have only one or the other, but not both (i.e. to provide either the statically configured CAM or the rule based ACL but not both).

Rule Based ACL

Each rule based ACL will operate to provide a keyword of "secured-host" which will be applied to a learned and validated source IP address for hosts. All other source IP addresses will be denied. Any other ACL rule without the keyword will be used as is, which means that other ACL rules will be applied to data packets received on the ports without alteration, but notably if a source IP address is not designated as a secure host then it will dropped, so none of the ACL rules would be applied to it.

Command Line Interface

Provided herein below are some examples of the syntax of code which can be generated via an interface between user, such as system administrator, and the CPU of the switch which controls the operation of the switch, and the programming of the CAM-ACL.

ACL

The ACL will provide for use of a keyword, "secured-host" which can be used to identify source IP addresses which have been learned and validated. The user can configure the ACL with this as the source subnet.

The language below shows exemplary syntax from an embodiment of command line interface for switch where different key words are defined and specifically the last line shows the designation of "secured host" as applying to secure IP hosts.

```
>ip access-list extended 111
>permit ip ?
(config-ext-nacl)#permit ip
  A.B.C.D or A.B.C.D/L    IP address/Subnet mask
  length
  any                     Any destination host
  host                    A single destination host
  secured-host            Secure IP hosts
```

Configuration

As discussed above the anti source IP spoofing functions herein can be enabled on a port by port basis. At the port, or interface, level the syntax utilized in connection with the command line interface for a switch is shown as follows for enabling the anti-spoofing feature on an interface, where the last two lines of this text corresponds to the command for enabling the anti-spoofing functions.

```
srcip-security <CR>
MON-SW-BigIron Router(config-if-e1000-1/1)#srcip?
  srcip-security         Configure source ip security for
  this interface
```

In one embodiment the dynamic learning of source IP addresses is enabled by default, but commands will be available to disable the dynamic learning. In addition other options for configuration could include:

```
MON-SW-BigIron Router(config-it-e1000-1/1)#srcip
  A.B.C.D              IP Address
  DECIMAL              Number of Allowed source IP
  Addresses
  ageing               Disable aging
  trusted-net          Network to be trusted to learn IP
  address
  <cr>
```

Much of the configuration above pertains to configurations implemented at the interface or port level. Additionally a number of configurations can be applied at global level to multiple interfaces, or ports of a switch. The language below shows command line interface text associated with globally configuring the switch for different aspects of function such as setting a max-age out time for a source IP address, setting the maximum number of IP addresses per port, the disabling of the aging function of port, and other configuration commands. Of course these configurations could also be applied on a port by port basis if a user desired to do so.

```
MON-SW-BigIron Router(config)#srcip ?
  max-age                   Age out time for learned sourceIP
  entries
  max-ipaddr-per-interface  Maximum number of addresses to learn
                            per interface
  ageing                    Disable aging
  trusted-net               Network to be trusted to learn IP
  address
  no-dynamic-learning       Disables dynamic learning of IP
  Addresses
```

Show Commands

Given the above operation of the system, it is clear that at times it can be advantageous for a system administrator user to be able to view information regarding the status and configuration of the system relative to implementation of the security functions disclosed herein. A review of some of the tables and information which are available to a user of an embodiment of the system herein is provided to further illustrate aspects of an embodiment of the system herein.

For example using a command in the command line interface of "sh srcip-sec-table" can display all the IP addresses learned or currently being learned on all ports which have srcip-security enabled. An example of such a table is shown below.

| BigIron Router#sh srcip-sec-table | | | | | |
|---|---|---|---|---|---|
| IP Address | MAC Address | Port | State | Learn-Scheme | Age |
| 192.168.20.177 | 000b.cd3d.808a | 4/20 | LEARNING | DHCP | 0 |
| 25.25.25.25 | 0007.e90f.eaa1 | 4/20 | LEARNT | IP_DATA | 80 |
| 192.168.20.50 | 0007.1234.1111 | 4/20 | LEARNT | STATIC | 0 |
| 192.168.20.51 | 0007.1234.abcd | 4/20 | LEARNT | STATIC | 0 |

As shown the above table indicates total entries=4 total learnt entries=3.

The show srcip-sec-table command can also provide for a view of other aspects of the system such as the status of an IP address, a configuration or the status of specific port the basic elements of the commands are shown below.

| MON-SW-BigIron Router#sh srcip | |
|---|---|
| A.B.C.D | IP address |
| configuration | Display the sourceIp-security configuration |
| ethernet | slot/port |
| \| | Output modifiers |
| <cr> | |

A specific command for viewing the table for a specific source IP address 25.25.25.25 is shown below.

| MON-SW-BigIron Router#sh srcip 25.25.25.25 | | | | | |
|---|---|---|---|---|---|
| IP Address | MAC Address | Port | State | Learn-Scheme | Age |
| 25.25.25.25 | 0007.e90f.eaa1 | 4/20 | LEARNT | IP_DATA | 0 |

HashT: Total Number of learnt SrcIp + MAC entries = 1

A specific command for viewing a table for viewing security configurations is shown below, where a switch is configured such that the security procedures are enabled and the number of source IP addresses per port is set at 64.

```
MON-SW-BigIron Router#sh srcip conf
Global Configuration:-
    Enabled: 1
    Max no entries per interface (global): 64
    Age out time: 180
    Ageing: enabled
    Aging frequenzy: 10
    Trusted Net(global): 0.0.0.0
    Trusted NetMask(global): 0.0.0.0
Port specific configuration:-
    Port: 4/20
        Max Entries: 64
        Trusted Net: 0.0.0.0
        Trusted NetMask: 0.0.0.0
```

A specific command for viewing a table for showing the status of source IP addresses for a specific port 4/20 of switch is shown below.

| MON-SW-BigIron Router#sh srcip e 4/20 | | | | | |
|---|---|---|---|---|---|
| IP Address | MAC Address | Port | State | Learn-Scheme | Age |
| 25.25.25.25 | 0007.e90f.eaa1 | 4/20 | LEARNT | IP_DATA | 20 |
| 192.168.20.50 | 0007.1234.1111 | 4/20 | LEARNT | STATIC | 0 |
| 192.168.20.51 | 0007.1234.abcd | 4/20 | LEARNT | STATIC | 0 |

Total entries = 3 total learnt entries = 3

The language below shows the commands and table for a specific address which includes 25 and is on interface 4/20.

| MON-SW-BigIron Router#sh srcip e 4/20 \| incl 25 | | | | | |
|---|---|---|---|---|---|
| 25.25.25.25 | 0007.e90f.eaa1 | 4/20 | LEARNT | IP_DATA | 50 |

Clear Commands

During the course of operation of the network device herein there may be times when it is desired to clear learned hosts. Commands can be provided specifically for clearing the CAM-ACL of the learned and validated source IP addresses. Additionally, statically configured hosts can be removed when the user removes them from the configuration from the specified vlan.

The language shown below provides for clearing all learned source IP addresses from a table.

| MON-SW-BigIron Router#clear srcip? | |
|---|---|
| srcip-security-table | Flush the srcip security table |

The language shown below provides for clearing a specific learned source IP addresses from a table.

| MON-SW-BigIron Router#clear srcip ? |
|---|
| A.B.C.D    IP Address |
| MON-SW-BigIron Router#clear srcip 25.25.25.25 |

The language shown below provides for clearing selected source IP addresses from a table.

| | MON-SW-BigIron Router#sh srcip | | | | |
|---|---|---|---|---|---|
| IP Address | MAC Address | Port | State | Learn-Scheme | Age |
| 192.168.20.50 | 0007.1234.1111 | 4/20 | LEARNT | STATIC | 0 |
| 192.168.20.51 | 0007.1234.abcd | 4/20 | LEARNT | STATIC | 0 |

Total entries = 2 total learnt entries = 2

The language below can be used to provide commands to clear all the learned hosts from the specified interface.
Interface e 1/1
clear srcip-host <CR>
It should be noted that the numerous examples of command language provided above are merely illustrative. One of skill in the art will recognize that the specific command language can be varied, as can different aspects of the network devices operation, and still be such that it is with the scope of the general teaching herein.

The above described system and method is very flexible and can provide for a range of different implementation. For example, where desired the source IP address can be validated against the subnet. The system can also provide for a trusted-subnet that the user can configure.

In order to minimize the demands placed on the CPU of the switch, data packets with source IP packets which do not pass the security procedures herein can be dropped, without maintaining a record of which source IP addresses have been dropped. However, other embodiments can provide a log of denied packets. In order to keep a record of discarded packets, but still provide for some protection of the CPU resources, the operation can provide for forwarding discarded packets to a mirror port.

Figure 6:
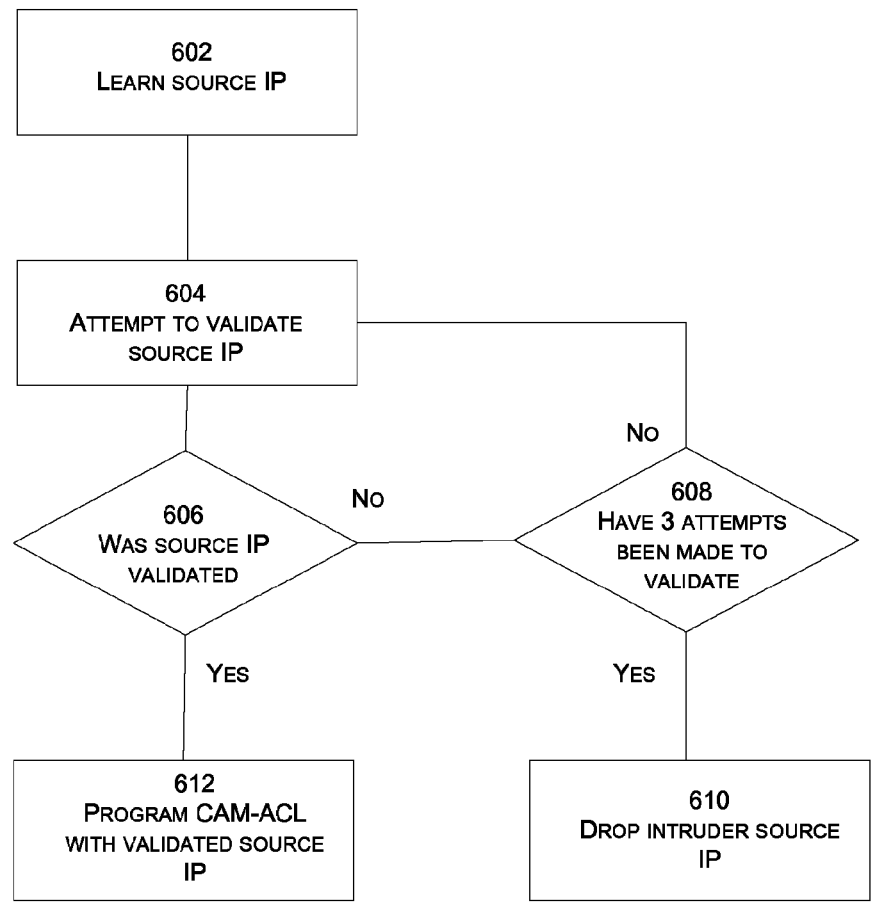
FIG. 6 shows a method of an embodiment herein, for validating learned source IP addresses.

FIG. 6 shows a flow chart of a method 600 of an embodiment herein. The initial step in the method is learning 602 the source IP address provided by a host connected to a subnet. This learned source IP address would be a new source IP address in that it would not be stored CAM-ACL and it would not have previously been associated with the MAC address of the host which it is presently associated with. As discussed above the source IP address could be learned a number of different ways. After a new source IP address is learned, the network device will operate to attempt to validate 604 the source IP address. Examples of different ways of validating learned source IP address are discussed above. Following the validation attempt, a determination 606 is made as to whether the validation attempt was successful. If the validation attempt was not successful then a determination 608 as to the number of attempts is made. If three attempts have been made then data packets with the new source IP address, which has been learned but not validated, are dropped 610. If it is determined that 3 or more attempts to validate the learned source IP address have not been made, then another attempt 604 is made to validate the source IP address. If at 606 it is determined that the source IP address was validated, then the CAM-ACL is programmed with the new source IP address, which has been learned and validated, and as discussed above the CAM-ACL can operate to match the source IP address with the MAC address for the host. Further, it should be recognized that the number of attempts made to validate a newly learned source IP address could be varied such that more or less than 3 attempts are made to validate a source IP address.

Figure 7:
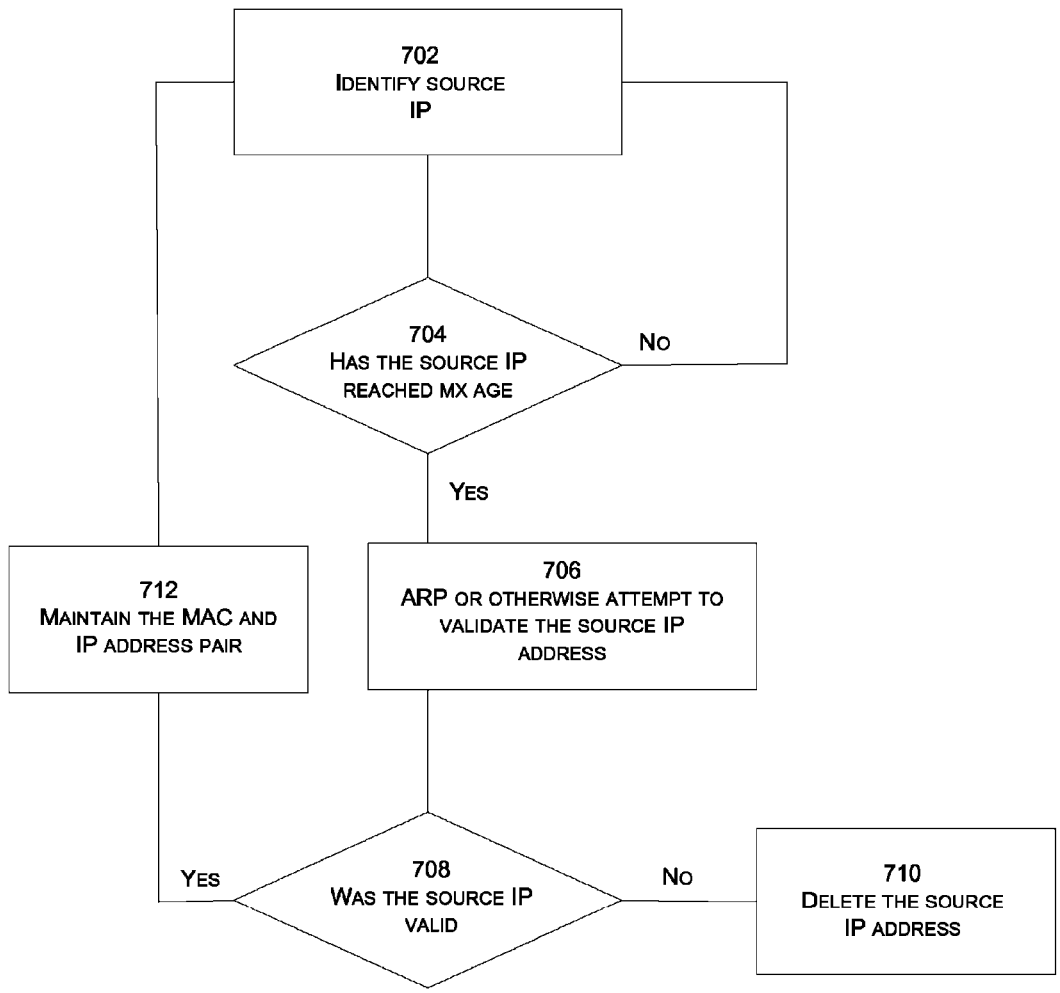
FIG. 7 shows a method of an embodiment herein for determining is a source IP address should be aged out.

FIG. 7 shows a flow chart of a method 700 of an embodiment herein. The method 700 provides for determining if a source IP address stored in the CAM-ACL should be aged out, which would result in the source IP address being removed from the CAM ACL and another source IP address and MAC address pair could take its place. At step 702 a source IP address in the CAM-ACL is identified. This source IP address would a source IP address that had previously been learned and validated. A determination 704 is made as to whether the last activity detected from the host having the identified source IP address, occurred more than predetermined age out time in the past. For example when was the last data packet received from the host, and was this data packet received more than 2 minutes ago. If the last activity does not exceed an age out time period, then another source IP address can be checked to see if it should be aged out. If it is determined that the age out time period has been exceeded, then the processor of the switch can generate an ARP request to check 706 and see if the identified source IP address is still up on the subnet. Additionally, other procedures, for example ICMP could be used to the see if the host with the identified source IP address is still up on the subnet. A determination 708 is then made to regarding whether the source IP was validated—for example, did the host respond to an ARP request. If the source IP was not validated then the source IP address is deleted 710 from the CAM-ACL. If the source IP address is validated then the MAC and source IP address are maintained 712 in the CAM-ACL, and another source IP address can be identified and analyzed starting at 702.

Figure 8:
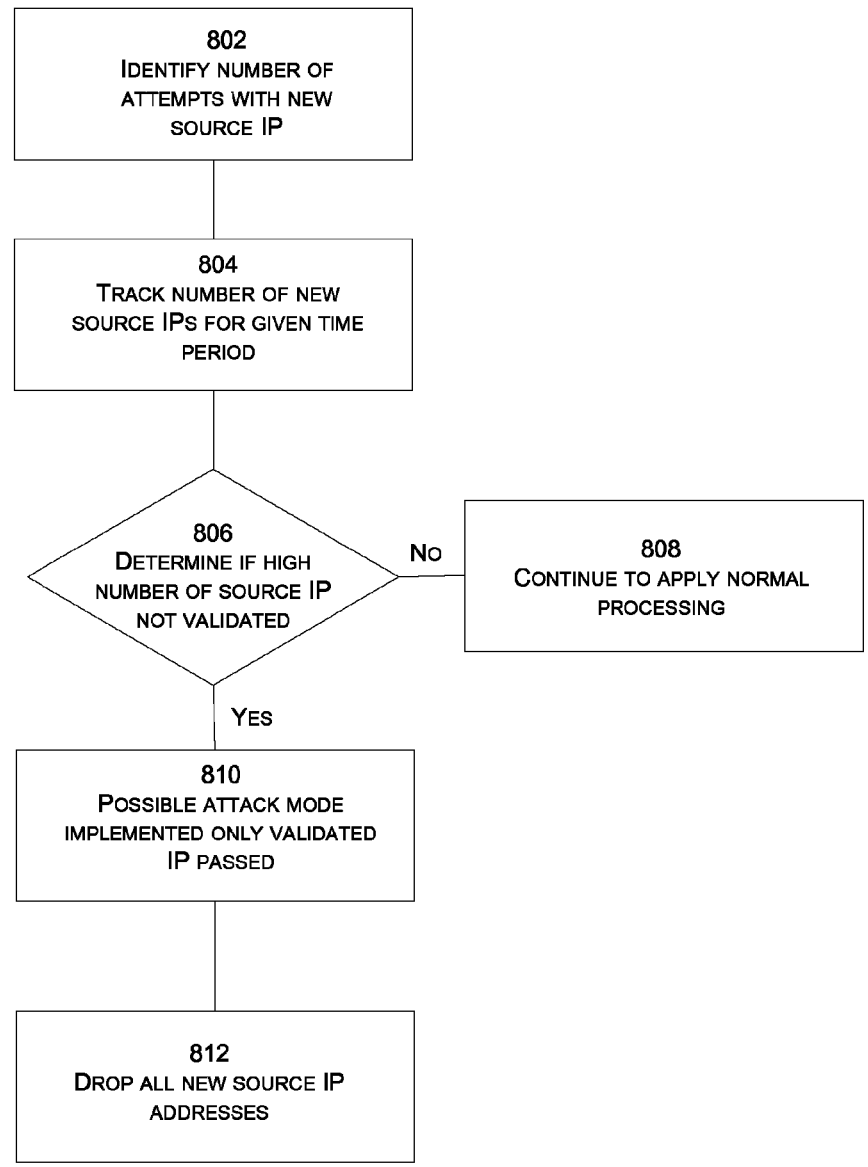
FIG. 8 shows a method of an embodiment herein for determining if a possible spoofed source IP attack is occurring.

FIG. 8 shows a flow chart of a method 800 of an embodiment herein. The method 800 provides for identifying 802 the number of attempts for new source IP addresses to come up on a port of a network device, or to otherwise to transmit or receive data packets through a port of the network device. As discussed above when a new source IP addressed is learned a method herein provides for attempting to then validate the new source IP address. The method 800, further provides for tracking 804 the number of new source IP addresses which are not successfully validated during a given time period. The number of unsuccessful validations for the given time period is then analyzed to determine 806 if the number of new source IP addresses is higher than expected. If the number of unsuccessful attempts to validate new source IP addresses does not exceed a threshold level, then the method will continue to apply 808 the normal processing operation described above.

However, if the number of new source IP addresses that cannot be validated exceeds a threshold number, then the system will go into a possible attack mode 810. In the possible attack mode the system will operate to drop all data packets coming from new source IP addresses. This means that new source IP address and MAC address pairs will not be added to the CAM-ACL while the system is in a possible attack mode. Further, while in this mode the system will not attempt to validate new source IP addresses. This possible attack mode functions to protect the CPU from becoming overloaded with trying to validate an exceptionally high number of new source IP addresses, which could occur when a spoofed source IP address attack is occurring.

At the step of determining if the number source IP addresses which cannot be validated is high, the system can utilize a predetermined threshold number for an allowable number of unsuccessful validation attempts. This predetermined number could be input by a system administrator. Alternatively, instead of using a predetermined threshold number, the system could provide for a degree of self monitoring and learning, such that the system will observe historic operation of the system to determine, based on past operation, an expected number of unsuccessful validation attempts for a given time period on a given port.

Figure 9:
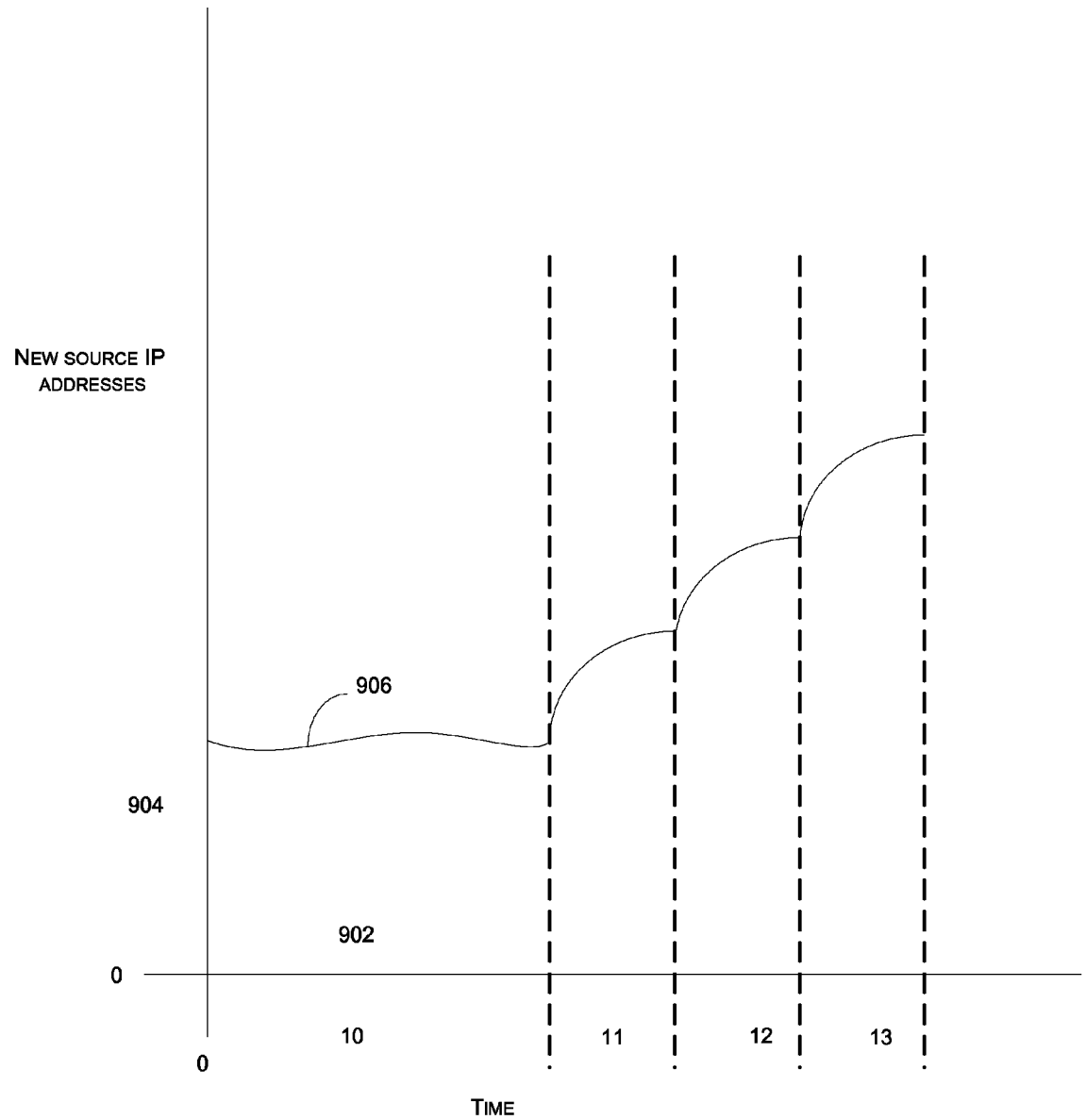
FIG. 9 shows a graph for an embodiment herein for determining an expected number of failed validation attempts.

FIG. 9 is a graph 900 illustrates aspects of the operation of system where the expected number of unsuccessful validation attempts is determined based on the past operation of the system. Axis 902 shows time, and axis 904 shows the number of unsuccessful validation attempts. During time $t_0$ the operation of the system is shows a relatively constant number of unsuccessful validation attempts per unit time, where the number of unsuccessful validation attempts is shown by line 906. During time period t1 a substantial increase in the number of unsuccessful validation attempts is observed. Time period t1 is followed by time periods t2 and t3 which show increasing numbers of unsuccessful validation attempts. The operation of the system could be implemented in a number of different ways. For example, the system could provide that after three time periods (t1, t2, t3) of increasing number of unsuccessful validation attempts the system goes into possible attack mode. For example, in a situation where ten unsuccessful validation attempts normal occur during typical two minute time interval, and then the system sees a number of consecutive two minute time intervals where the number of unsuccessful validation attempts increases to 20 per two minute time intervals, the system could be under an IP spoofing attack. While in the possible attack mode the system could continue to monitor the number of data packets received from new source. If the system determines that it is receiving a high number of new source IP address, then the system could continue to operate in possible attack mode. When the system determines that the number of new source IP addresses has decreased to an expected range, then the system could go back to normal operation. In another embodiment, the system could operate such that when it goes into possible attack mode, it remains in possible attack mode for a predetermined amount of time, and then after the predetermined amount of time it goes back into normal operating mode.

Another aspect of an embodiment herein is that it allows for dynamic application of forwarding policy or rules. The forwarding of packets on a network device including switching functionality can be based, for example, on the destination MAC address. The policy based forwarding extends the forwarding criteria to include the protocol type, the application ports, such as, UDP/TCP ports, MTU, rate-limiting etc. For example, certain types of data packet protocols could be restricted from being transmitted to devices on certain ports. Or newly learned source IP addresses may be restricted from transmitting or receiving data from devices on other ports of the system. These policies can be extended to hosts learned as a result of the dynamic learning and validation procedures. The forwarding criteria can augmented with the newly learned and validated source IP address, or with statically MAC address/IP address pairs. The traffic from the validated hosts automatically uses the forwarding policies. The traffic from other dynamic source IP Addresses which fail to be validated would be discarded.

The switching device can allow a user to configure forwarding policies so that a user can specify the subset of data traffic which passes these forwarding policies will be forwarded, while other data traffic that does not pass the forwarding policies will be discarded or dropped.

These forwarding policies are configured using the Extended Access Control Lists, where a user could choose the specific hosts, specific subnets for source and destination ip addresses, specific application ports for UDP/TCP, etc.

The Source IP Anti-spoofing will restrict the forwarding decisions to apply to only a subset of hosts that are considered to be validated. The traffic from all other hosts will get discarded. The forwarding policies are modified when the hosts are validated using the validation techniques discussed above.

The following example illustrates the forwarding policy and its modification to the set of validated hosts.

Access-list 120 permit udp any host 10.10.10.1
Access-list 120 deny ip any any

The above access-list will permit any UDP application traffic to the destination of 10.10.10.1. All other traffic is discarded. The above access-list does not specify the source ip address that should be allowed. Thus the forwarding policy will apply source IP addresses, and apply this to all the source ip addresses.

With the Source-IP Anti spoofing running, say only the hosts 20.20.20.1, 20.20.20.2 and 20.20.20.3 are validated. All other hosts are denied. Thus, the above access-list will now only allow the forwarding from the above hosts, with UDP application port, and to destination address of 10.10.10.1. All other source ip addresses, such as, 20.20.20.5 etc. will be discarded even if they have the UDP protocol type, and to the destination address of 10.10.10.1.

In one embodiment forwarding policies are defined to alter, or control, data packet forwarding based on criteria which can be defined, or modified, by a system administrator. In this embodiment ACLs are used to specify this forwarding criterion. The example below illustrates simple forwarding criteria using the ACL.

Ip access-list extend 111
permit secure-host any
deny ip any any

The above clause will allow packets from validated hosts to go through. The rest of the traffic is denied. This criteria would apply to hosts on the subnet where this ACL criteria is applied.

When Source-IP Anti-spoofing is applied, the anti-spoofing procedures validate a list of hosts on the subnet that are considered valid. Once the hosts are validated, the above forwarding policies applied via the ACL are modified. The ACL is extended to include only the set of validated hosts.

This operation allows a system administrator to continue to use the forwarding policies of the ACL, and the system administrator does not have to modify the forwarding policy for each validated host. Instead, the policies are automatically extended/modified to allow the traffic from valid hosts. On a large network with several subnets, this saves the user from having to modify their policy for each host.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:
1. A method comprising:
   determining, by a network device, whether a MAC address included in a data packet received on a port of the network device is stored in a table of the network device, the table including a plurality of MAC address and source IP address pairs; and
   if the MAC address is not stored in the table:
      learning, by the network device, a source IP address included in the data packet, wherein the learning is performed using a first technique;

if the learning is successful, validating the source IP address by the network device, wherein the validating is performed using a second technique distinct from the first technique; and if the validating is successful, storing, by the network device, the MAC address and the source IP address as a pair in the table.

2. The method of claim 1 wherein learning the source IP address using the first technique comprises transmitting a reverse Address Resolution Protocol (ARP) message based on a MAC address included in the data packet, and wherein the learning is successful if a source IP address included in a response to the reverse ARP message matches the source IP address included in the data packet.

3. The method of claim 2 wherein validating the source IP address using the second technique comprises transmitting an ARP message based on the source IP address included in the data packet, and wherein the validating is successful if a MAC address included in a response to the ARP message matches the MAC address included in the data packet.

4. The method of claim 1 wherein learning the source IP address using the first technique comprises transmitting an ARP message based on the source IP address included in the data packet, and wherein the learning is successful if a MAC address included in a response to the ARP message matches a MAC address included in the data packet.

5. The method of claim 4 wherein validating the source IP address using the second technique comprises generating a reverse Address Resolution Protocol (ARP) message based on the MAC address included in the data packet, and wherein the validating is successful if a source IP address included in a response to the reverse ARP message matches the source IP address included in the data packet.

6. The method of claim 1 wherein if the learning or the validating is unsuccessful, preventing the data packet from being passed through the port.

7. The method of claim 1 further comprising:
if the validating is unsuccessful:
determining a number of unsuccessful validation attempts over a predetermined, preceding time period; and
if the number of unsuccessful validation attempts is greater than a threshold number, causing the network device to operate in a mode wherein further data packets received by the network device that include source IP addresses not stored in the table are blocked without learning or validating the source IP addresses.

8. The method of claim 7 wherein the network device is configured to continue to operate in the mode until a predetermined condition has been satisfied.

9. The method of claim 7 wherein the threshold number is predetermined.

10. The method of claim 7 wherein the threshold number is determined dynamically by:
determining a first number of unsuccessful validation attempts over a first preceding time period;
determining a second number of unsuccessful validation attempts over a second preceding time period that is temporally adjacent to the first preceding time period; and
determining the threshold number based on an increase from the first number to the second number.

11. The method of claim 1 further comprising, subsequently to storing the source IP address in the table, applying a group of rules for forwarding additional data packets received on the port if the additional data packets include the source IP address.

12. A network device comprising:
a plurality of ports;
a storage component configured to store a table of MAC address and source IP address pairs; and
a control component configured to:
determine whether a MAC address included in a data packet received on a port of the network device is stored in the table; and
if the MAC address is not stored in the table:
learn a source IP address included in the data packet using a first technique;
if the learning is successful, validate the source IP address using a second technique distinct from the first technique; and
if the validating is successful, store the MAC address and the source IP address as a pair in the table.

13. The network device of claim 12 wherein learning the source IP address using the first technique comprises transmitting a reverse Address Resolution Protocol (ARP) message based on a MAC address included in the data packet, and wherein the learning is successful if a source IP address included in a response to the reverse ARP message matches the source IP address included in the data packet.

14. The network device of claim 13 wherein validating the source IP address using the second technique comprises transmitting an ARP message based on the source IP address included in the data packet, and wherein the validating is successful if a MAC address included in a response to the ARP message matches the MAC address included in the data packet.

15. The network device of claim 12 wherein learning the source IP address using the first technique comprises transmitting an ARP message based on the source IP address included in the data packet, and wherein the learning is successful if a MAC address included in a response to the ARP message matches a MAC address included in the data packet.

16. The network device of claim 15 wherein validating the source IP address using the second technique comprises generating a reverse Address Resolution Protocol (ARP) message based on the MAC address included in the data packet, and wherein the validating is successful if a source IP address included in a response to the reverse ARP message matches the source IP address included in the data packet.

17. The network device of claim 12 wherein the control component is further configured to:
if the validating is unsuccessful:
determine a number of unsuccessful validation attempts over a predetermined, preceding time period; and
if the number of unsuccessful validation attempts is greater than a threshold number, cause the network device to operate in a mode wherein further data packets received by the network device that include source IP addresses not stored in the table are blocked without learning or validating the source IP addresses.

18. The network device of claim 17 wherein the threshold number is determined dynamically by:
determining a first number of unsuccessful validation attempts over a first preceding time period;

determining a second number of unsuccessful validation attempts over a second preceding time period that is temporally adjacent to the first preceding time period; and determining the threshold number based on an increase from the first number to the second number.

19. The network device of claim 12 wherein the control component is further configured to, subsequently to storing the source IP address in the table, apply a group of rules for forwarding additional data packets received on the port if the additional data packets include the source IP address.

* * * * *